(12) United States Patent
Kogawa et al.

(10) Patent No.: US 8,331,333 B2
(45) Date of Patent: Dec. 11, 2012

(54) TRANSMITTER, REMOTE CONTROLLER AND TRANSMISSION METHOD USING DUMMY SIGNAL TO REDUCE INTERFERENCE

(75) Inventors: Tsuyoshi Kogawa, Kanagawa-ken (JP); Takafumi Sakamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 470 days.

(21) Appl. No.: 12/617,261

(22) Filed: Nov. 12, 2009

(65) Prior Publication Data
US 2010/0124215 A1 May 20, 2010

(30) Foreign Application Priority Data

Nov. 14, 2008 (JP) .............................. P2008-292622

(51) Int. Cl.
*H04J 3/00* (2006.01)
*H04B 7/212* (2006.01)
*H04L 12/413* (2006.01)

(52) U.S. Cl. ........ 370/337; 370/347; 370/442; 370/445; 455/501

(58) Field of Classification Search .................. 370/311, 370/338, 348, 350, 352, 437, 442, 458, 508–509; 455/67.11, 127, 450, 452.1, 452.2, 509, 517, 455/522

See application file for complete search history.

(56) References Cited

U.S. PATENT DOCUMENTS

2004/0214582 A1 * 10/2004 Lan et al. .................... 455/452.2
2009/0109991 A1 * 4/2009 Lurie et al. .................... 370/445

FOREIGN PATENT DOCUMENTS

JP 2007-214819 8/2007

OTHER PUBLICATIONS

Office Action (with English translation) mailed on Aug. 28, 2012, in counterpart Japanese Patent Appln No. 2008-292622 (4 pages).

* cited by examiner

*Primary Examiner* — Habte Mered
(74) *Attorney, Agent, or Firm* — Oblon, Spivak, McClelland, Maier & Neustadt, L.L.P.

(57) ABSTRACT

A transmitter includes a power measurement unit, a carrier sense unit, and a transmission unit. A first frequency band is allocated to a TDMA system. The power measurement unit measures a receiving power over a part of a first frequency band and a second frequency band. The carrier sense unit continues to check for a certain duration whether the receiving power is smaller than a threshold. The transmission unit generates a transmission signal including a dummy signal and a data signal when the receiving power has been smaller than the threshold for the certain duration. Moreover, the transmission unit transmits the transmission signal using the second frequency band.

16 Claims, 32 Drawing Sheets

TRANSMITTER, REMOTE CONTROLLER AND TRANSMISSION METHOD USING DUMMY SIGNAL TO REDUCE INTERFERENCE

CROSS REFERENCE TO RELATED APPLICATIONS

This application is based upon and claims the benefit of priority from the Japanese Patent Application No. 2008-292622, filed on Nov. 14, 2008, the entire contents of which are incorporated herein by reference.

BACKGROUND OF THE INVENTION

1. Field of the Invention

The present invention relates to a transmitter, a remote controller and a transmission method.

2. Description of the Related Art

Recently, many wireless communication systems share frequency resource. The frequency resource is divided into frequency bands. Each frequency band is used by a wireless communication system. In each wireless communication system, a signal including an out-of-band component is transmitted. The out-of-band component gives an interference to other wireless communication systems. To avoid giving interference to other wireless communication systems, a guard band is inserted between the frequency bands. When the out-of-band component is wide, a wide guard band is required.

The wide guard band causes a degradation of a frequency efficiency. Therefore, the guard band is better to be as narrow as possible. However, if the guard band gets narrower, it is higher possibility that the out-of-band component exceeds the guard band. The out-of-band component which exceeds the guard band may give the interference to other wireless communication system.

To eliminate the out-of-band component which exceeds the guard band, a BPF (Band-Pass Filter) is used in a transmitter and a receiver. The BPF limits a bandwidth of the signal in a RF (Radio Frequency) band. The BPF with high precision achieves a precipitous fall of a power level of the out-of-band component. However, the BPF with high precision is expensive.

On the other hand, in the case that an adjacent wireless communication system performs a TDMA (Time Division Multiple Access), even if the BPF has low precision, the interference can be avoided in by sharing a time slot with the adjacent wireless communication system.

One of the technique to share the time slot with the adjacent wireless communication system is disclosed in JP-A 2007-214819(KOKAI). In this reference, the transmitter of a CR (Cognitive Radio) system transmits the signal in the time slot which is used by the adjacent wireless communication system. The transmitter of the CR system transmits the signal with low power in order to avoid giving the interference to adjacent wireless communication system. However, a transmission range is short because of the low power.

SUMMARY OF THE INVENTION

According to one aspect of the invention, a transmitter includes:
a power measurement unit measuring a receiving power over a part of a first frequency band and a second frequency band, the first frequency band is allocated to a TDMA system;
a carrier sense unit continuing to compare for a duration Tcs the receiving power with a threshold; and
a transmission unit transmitting a dummy signal using the second frequency band when the receiving power has been smaller than the threshold for the duration Tcs, and transmitting a data signal using the second frequency band after the dummy signal is transmitted.

DETAILED DESCRIPTION OF THE INVENTION

The embodiments will be explained with reference to the accompanying drawings.

Description of the First Embodiment

Figure 1:
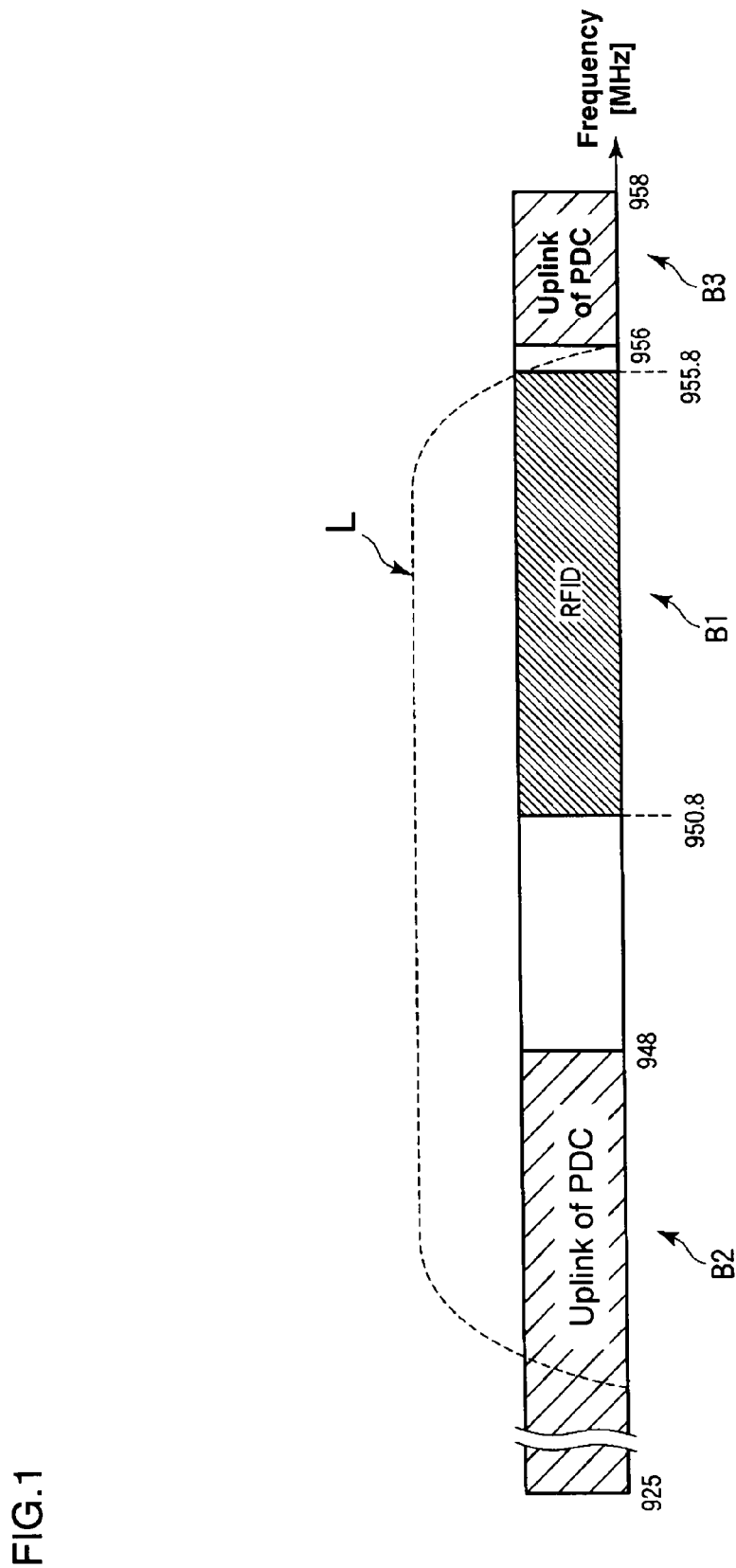
FIG. 1 is a diagram showing an example of frequency allocation.

As shown in FIG. 1, in Japan, a frequency band "B1" from 950.8 MHz to 955.8 MHz is allocated to an RFID system (Radio Frequency IDentification). Frequency bands "B2", "B3", which are adjacent to the frequency band "B1", are allocated to uplinks of a PDC (Personal Digital Cellular) system.

Figure 2:
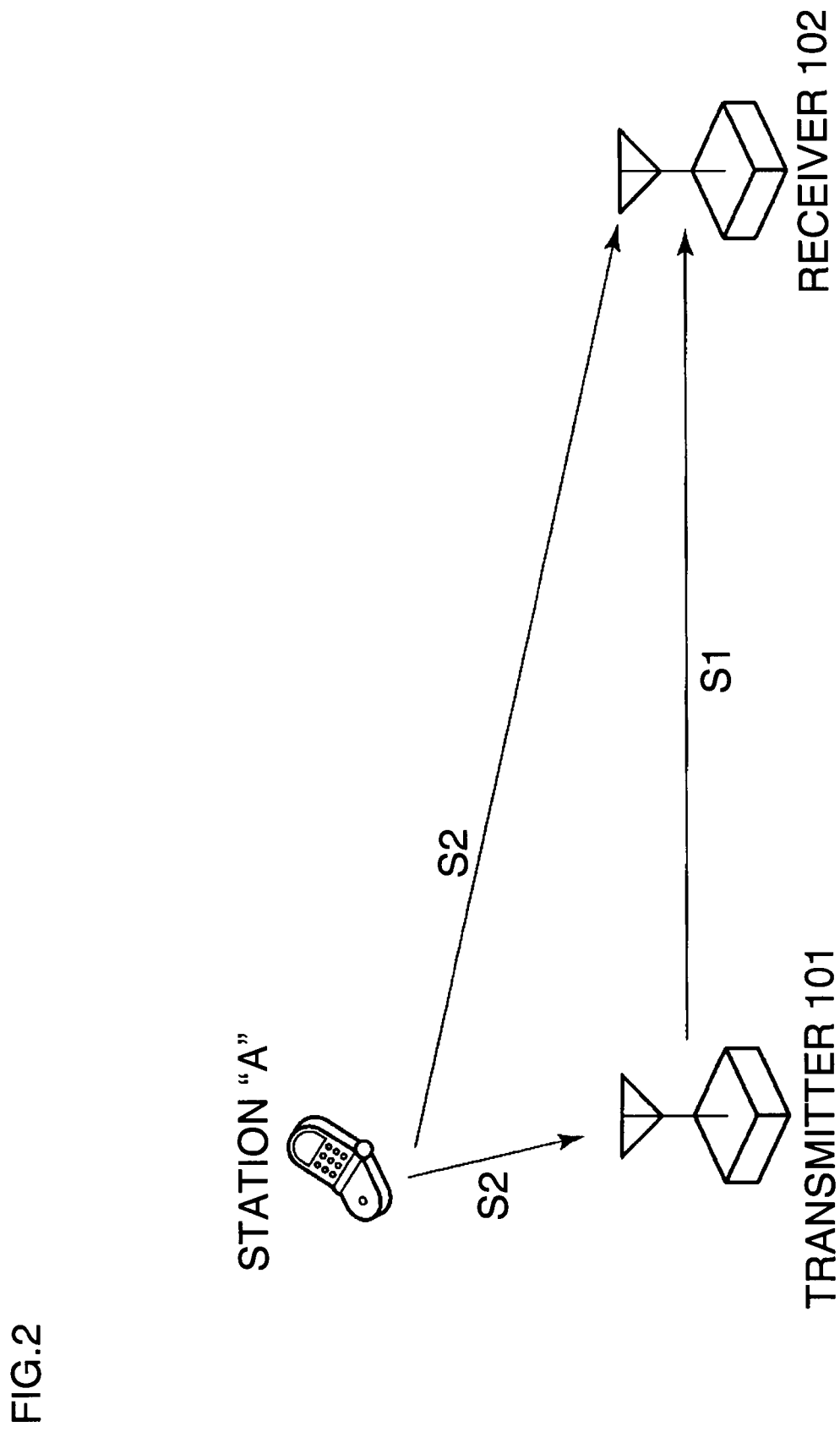
FIG. 2 is a diagram showing an example of the location of a transmitter, a receiver and a station.

In the first embodiment, a transmitter 101 in the RFID system, a receiver 102 in the RFID system, and a station "A" in the PDC system are located as shown in FIG. 2. The transmitter 101 and the receiver 102 in the RFID system adopt a BPF (Band-Pass Filter) which lets a frequency component of a signal within a frequency band "L" pass. Since the frequency band "L" includes both frequency bands of the RFID system and PDC system, both the transmitter 101 and the receiver 102 receive a signal S2 from the station "A" as interference. When the transmitter transmits a signal S1 to the receiver 102 at the same time as a transmission of the signal S2 from the station "A", the receiver 102 may fail to receive the signal S1. The signal S1 is described later.

In the first embodiment, the RFID system is adjacent or overlapping with the PDC system. Therefore, the transmitter 101 in the RFID system needs to share the frequency band "L" with the PDC system. The RFID system performs CSMA/CA (Carrier Sense Multiple Access with Collision Avoidance). The PDC system performs TDMA (Time Division Multiple Access).

The transmitter 101 performs CS (Carrier Sense) with a duration Tcs before transmitting a signal over the frequency band "L".

Figure 6:
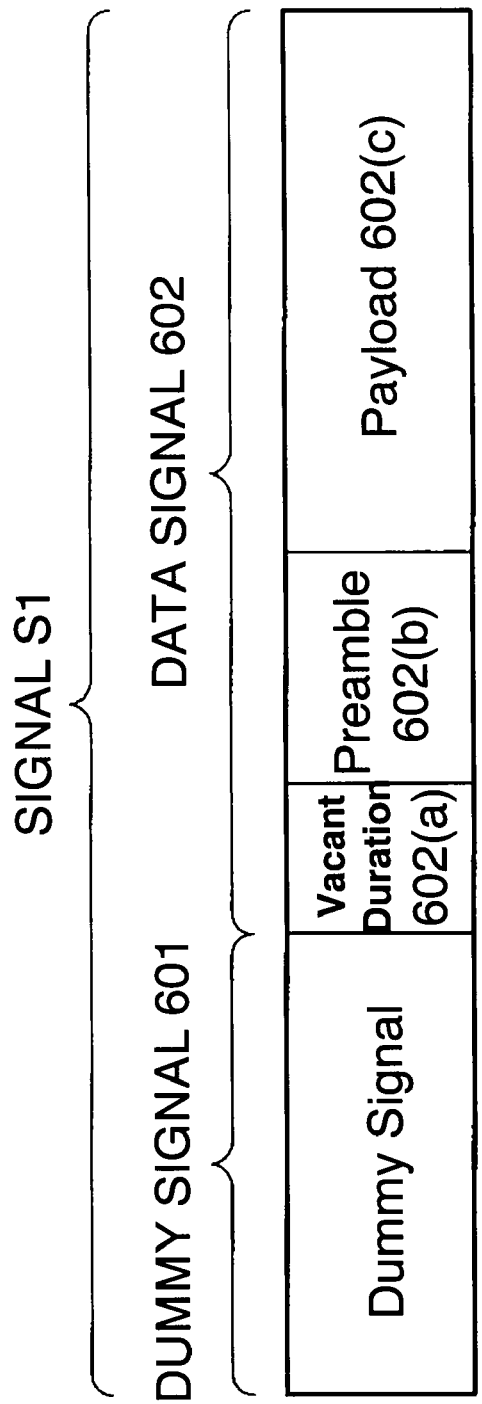
FIG. 6 shows a structure of a signal S1.

As shown in FIG. 6, the signal S1 includes a dummy signal 601 and a data signal 602. The dummy signal 601 is unused in the first embodiment. For example, it may be a pulse signal. The data signal 602 is transmitted following the dummy signal 601. The data signal 602 includes a vacant duration 602(a), a preamble 602(b), and a payload 602(c). The receiver 102 easily detects a start of the preamble 602(b), since the vacant duration 602(a) exists before it. Moreover, the receiver 102 detects the signal S1 and estimates a condition of the frequency band "B1" due to the preamble 602(b). The condition is used to decode of the payload 602(c). The payload 602(c) includes a data.

Figure 3:
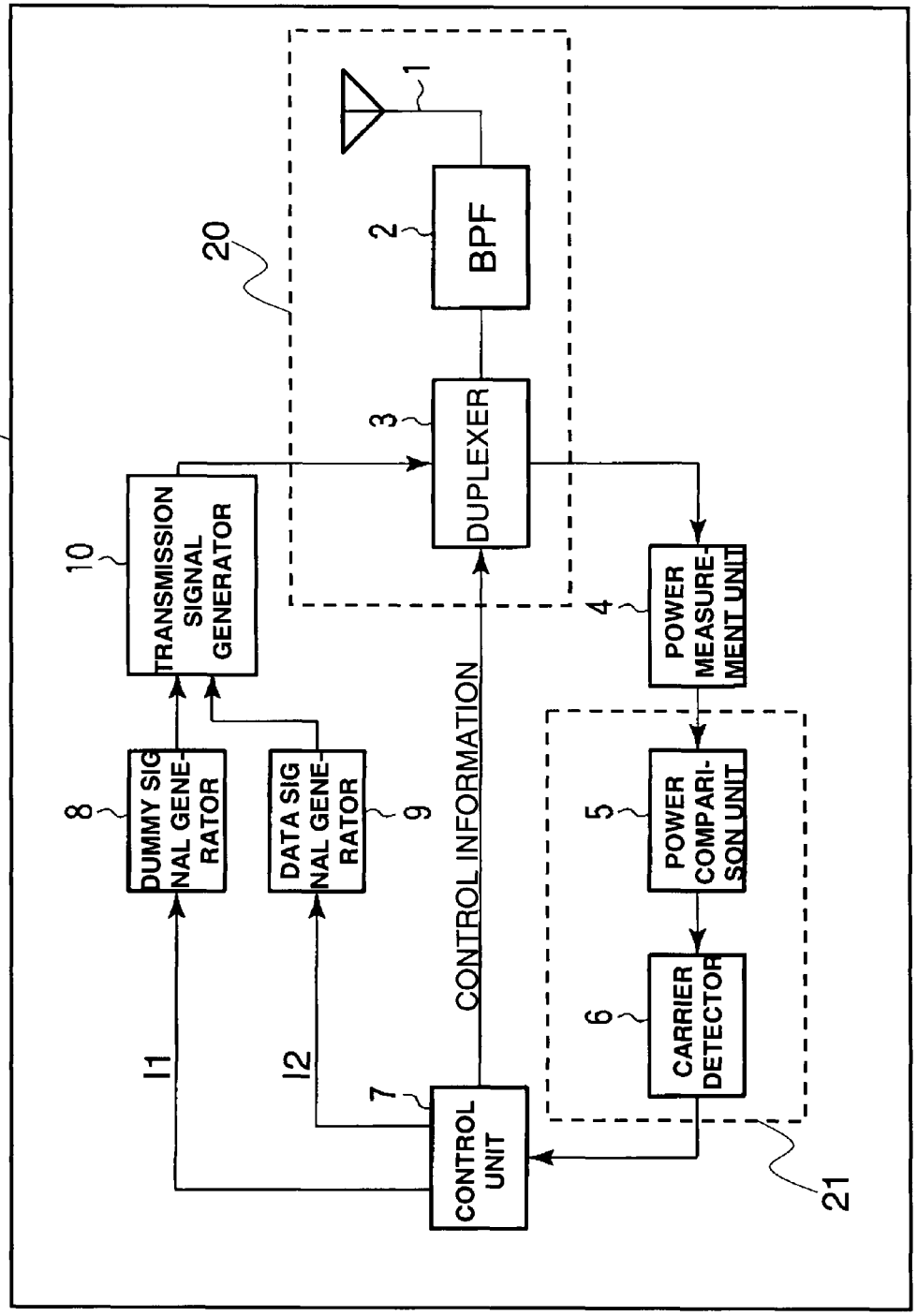
FIG. 3 is a block diagram showing a transmitter 101 according to the first embodiment.

As shown in FIG. 3, the transmitter 101 includes an antenna 1, the BPF 2, a duplexer 3, a power measurement unit 4, a power comparison unit 5, a carrier detector 6, a control unit 7, a dummy signal generator 8, a data signal generator 9, and a transmission signal generator 10.

The antenna 1, the BPF 2, and the duplexer 3 provide a transmission unit 20. Moreover, the power comparison unit 5 and the carrier detector 6 provide a carrier sense unit 21.

The antenna 1 receives a radio wave as a receiving signal and outputs it to the BPF 2. Also, the antenna 1 transmits the signal S1 which is input from the BPF 2 as a radio wave. The BPF 2 lets the frequency component of the receiving signal from the antenna 1 within the frequency band "L" pass to the duplexer 3. Also, the BPF 2 lets the frequency component of the signal S1 from the duplexer 3 within the frequency band "L" pass to the antenna 1. The duplexer 3 outputs the receiving signal from the BPF 2 to the power measurement unit 4. Also, the duplexer 3 outputs the signal S1 from the transmission signal generator 10 to the BPF 2.

The power measurement unit 4 measures a power of the receiving signal (hereinafter, "measurement power") from the duplexer 3 for a certain duration $\Delta t$. Then, the power measurement unit 4 outputs the measurement power to the power comparison unit 5. The power comparison unit 5 compares the measurement power with a threshold $Th\_p1$ which is given preliminarily. When the measurement power is larger than the threshold $Th\_p1$, the power comparison unit 5 outputs a BUSY signal to the carrier detector 6. On the other hand, when the measurement power is smaller than the threshold $Th\_p1$, the power comparison unit 5 outputs an IDLE signal to the carrier detector 6. In this embodiment, the BUSY signal has a higher power level than the IDLE signal.

The carrier detector 6 detects the BUSY signal from the power comparison unit 5 during the duration Tcs. When the carrier detector 6 has not detected the BUSY signal for the duration Tcs, the carrier detector 6 outputs an indication meaning that no signal is transmitted in the frequency band "L" (hereinafter, "no carrier indication") to the control unit 7.

Figure 4:
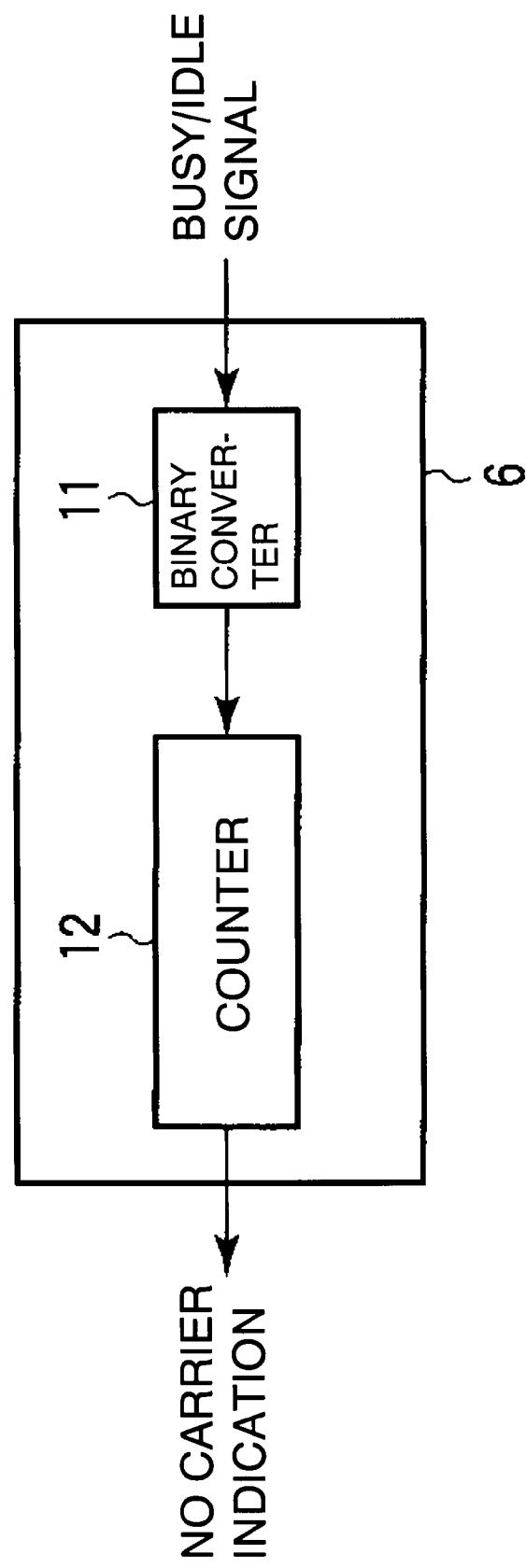
FIG. 4 is a block diagram showing a carrier detector 6 in the transmitter 101.

As shown in FIG. 4, the carrier detector 6 includes a binary converter 11 and a counter 12. The binary converter 11 converts an input signal, which is the BUSY or IDLE signal from the power comparison unit 5, to a binary code "0" or "1". When a power level of the input signal is larger than a threshold $Th\_p2$, the binary converter 11 determines that the input signal is the BUSY signal and outputs "0" to the counter 12. When the power level of the input signal is smaller than the threshold $Th\_p2$, the binary converter 11 determines that the input signal is the IDLE signal and outputs "1" to the counter 12.

The counter 12 counts input of the binary code of "1" from the binary converter 11. Then, the counter 12 calculates an idle time ($=\Delta t$*the counter 12). The counter 12 compares the idle time with the duration Tcs. If the idle time is equal or larger than the duration Tcs, it means that the frequency band "L" has not been used for more than the duration Tcs. Therefore, the counter 12 outputs the no carrier indication to the control unit 7.

When the control unit 7 gets the no carrier indication, the control unit 7 outputs indications I1, I2 to the dummy signal generator 8 and the data signal generator 9, respectively. According to the indication I1, the dummy signal generator 8 generates the dummy signal 601. Then, the dummy signal generator 8 outputs the dummy signal 601 to the transmission signal generator 10. According to the indication I2, the data signal generator 9 generates the data signal 602. Then, the data signal generator 9 outputs the data signal 602 to the transmission signal generator 10.

The transmission signal generator 10 combines the dummy signal 601 and the data signal 602 to obtain the signal S1. Then, the transmission signal generator 10 outputs the signal S1 to the duplexer 3.

The control unit 7 inputs a control information to the duplexer 3. According to the control information, the duplexer 3 outputs the signal S1 to the BPF 2. The antenna 1 transmits the signal S1 to the receiver 102 as a radio wave.

Figure 5:
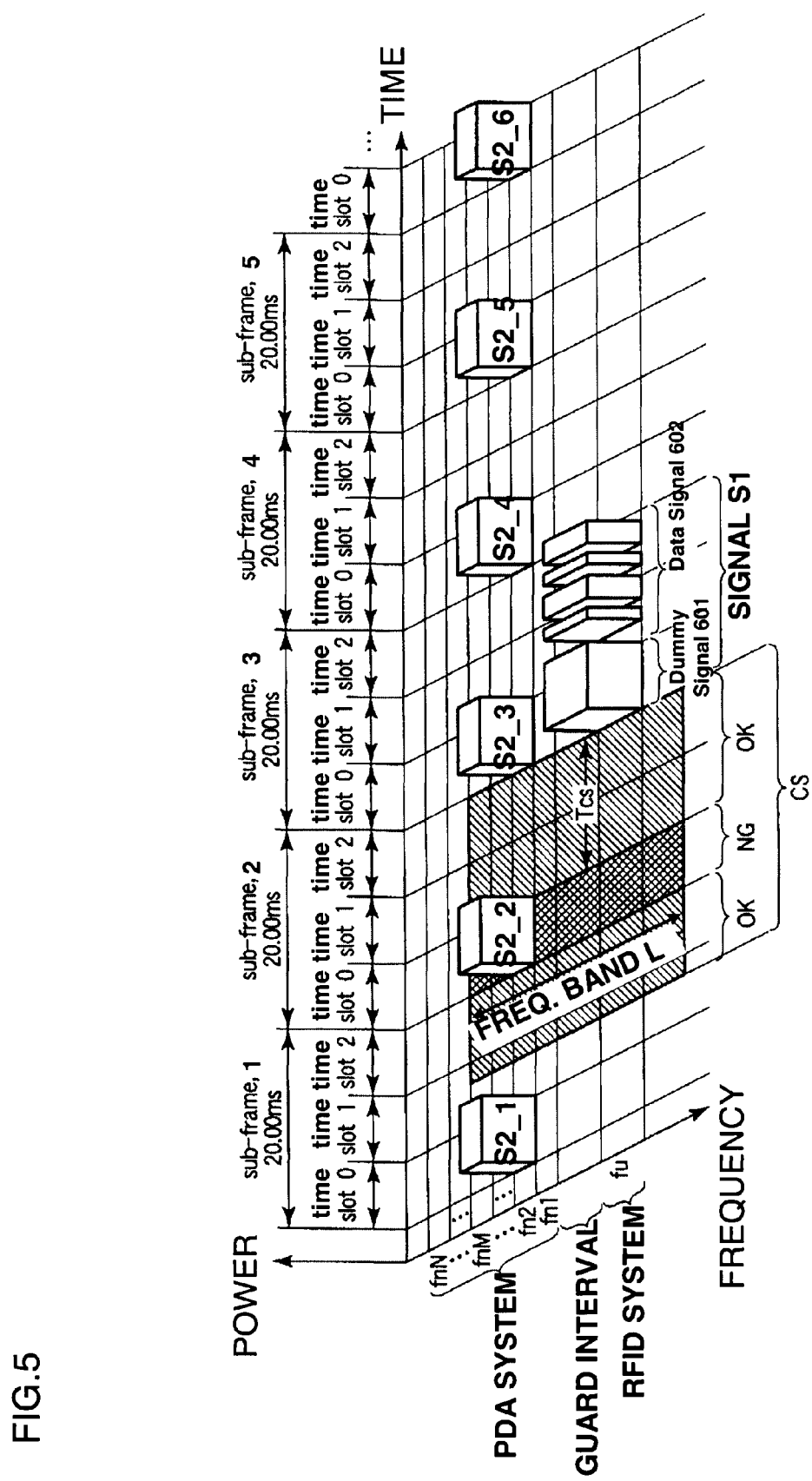
FIG. 5 shows a signal sequence which each signal is transmitted using a frequency band in a time slot.

As shown in FIG. 5, time is divided into sub-frames of 20 [ms] in the PDC system. Each sub-frame includes three time slots 0-2. In this embodiment, the station "A" transmits the signals S2_1, . . . , S2_6 using a frequency band "fn2" in the time slot 0. The transmitter 101 transmits the signal S1 using a frequency band "fu".

The transmitter 101 performs CS with the duration Tcs before transmitting the signal S1. "OK" in FIG. 5 means that the transmitter 101 does not detect any signals by the CS. On the other hand, "NG" in FIG. 5 means that the transmitter 101 detects the signal S2_2. Since the BPF 2 covers the frequency band "L" including the frequency band "fn2" of the PDC system, the transmitter 101 detects the signal S2_2 by the CS.

When the time slot 0 starts during the CS, the transmitter 101 detects the power of the signal S2_2 and wait until the time when the frequency band "L" turns to be idle. The frequency band "L" becomes idle at the time slot 1 and the idle continues for the duration Tcs. After detecting the idle for the duration Tcs, the transmitter 101 transmits the dummy signal 601. Then, the transmitter 101 transmits the data signal 602 in the time slots 1, 2. The dummy signal 601 prevents other transmitters in the RFID system from transmitting any signals.

The station "A" does not transmit any signals in the time slots 1, 2 while the transmitter 101 transmits the data signal 602. Therefore, the receiver 102 succeeds in receiving the data signal 602 without the interference from the station "A".

Figure 7:
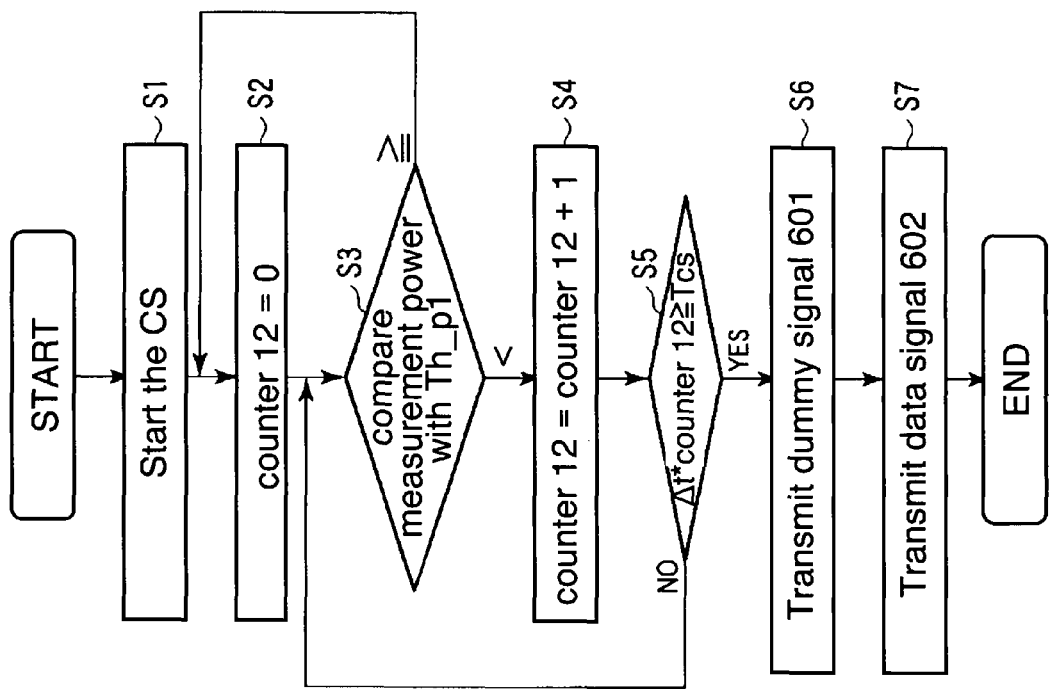
FIG. 7 is a flowchart explaining procedure of the transmitter 101.

Next, we will describe a procedure when the transmitter 101 transmits the signal S1. As shown in FIG. 7, when a request to transmit the data is generated, the transmitter 101 performs the CS in the step S1. Next, the transmitter 101 resets the counter 12 to "0" in the step S2, and compares the measurement power with the threshold Th_p1 in the step S3. If the measurement power is smaller than the threshold Th_p1, the counter 12 is incremented in the step S4. Then, the transmitter 101 compares the idle time (=the duration $\Delta t$*the counter 12) with the duration Tcs in the step S5. If the idle time is larger than the duration Tcs, the transmitter 101 transmits the dummy signal 601 in the step S6 and the data signal 602 in the step S7.

According to the first embodiment, the transmitter 101 and the receiver 102 can adopt a cheaper BPF with low precision by sharing the time slot with the adjacent wireless communication system without giving the interference each other. Moreover, since the transmitter 101 transmits the signal S1 without turning down the power, it can realize a longer transmission range compared with the conventional transmitter.

Description of the Second Embodiment

In the second embodiment, the procedure when the transmitter 101 transmits the signal S1 is different from the first embodiment.

Figure 8:
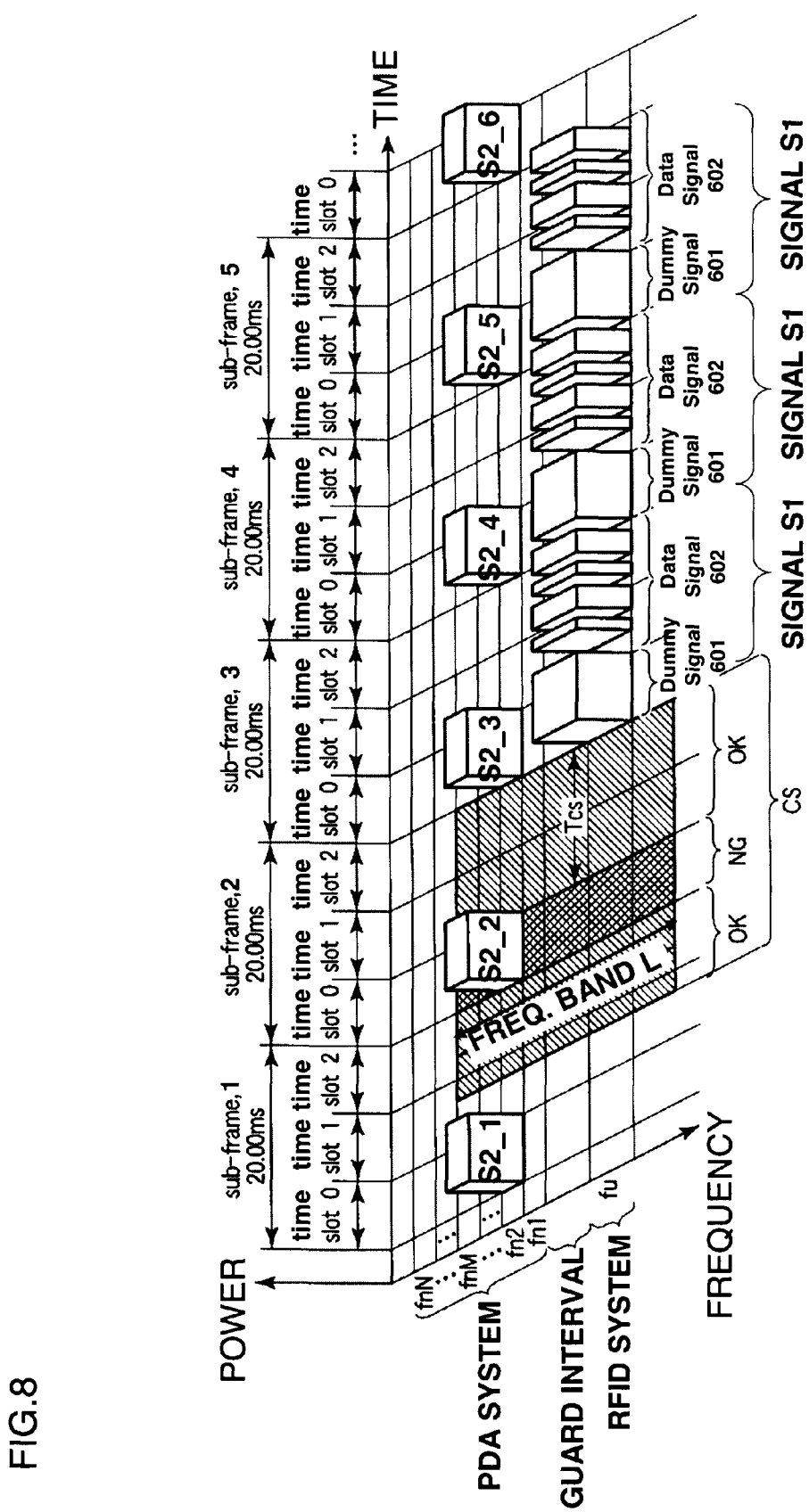
FIG. 8 is a signal sequence which each signal is transmitted using a frequency band in a time slot according to the second embodiment.

As shown in FIG. 8, the transmitter 101 transmits the signal S1 after succeed in the CS as same as the first embodiment. In the second embodiment, the transmitter 101 transmits the signal S1 again, following the previous transmission of the signal S1. In FIG. 8, the transmitter 101 transmits the signal S1 three times. The number of repetition may not be limited three. The receiver 102 succeeds in receiving the signal S1 if the receiver 102 correctly receives at least one of the three transmissions of the signal S1.

Figure 9:
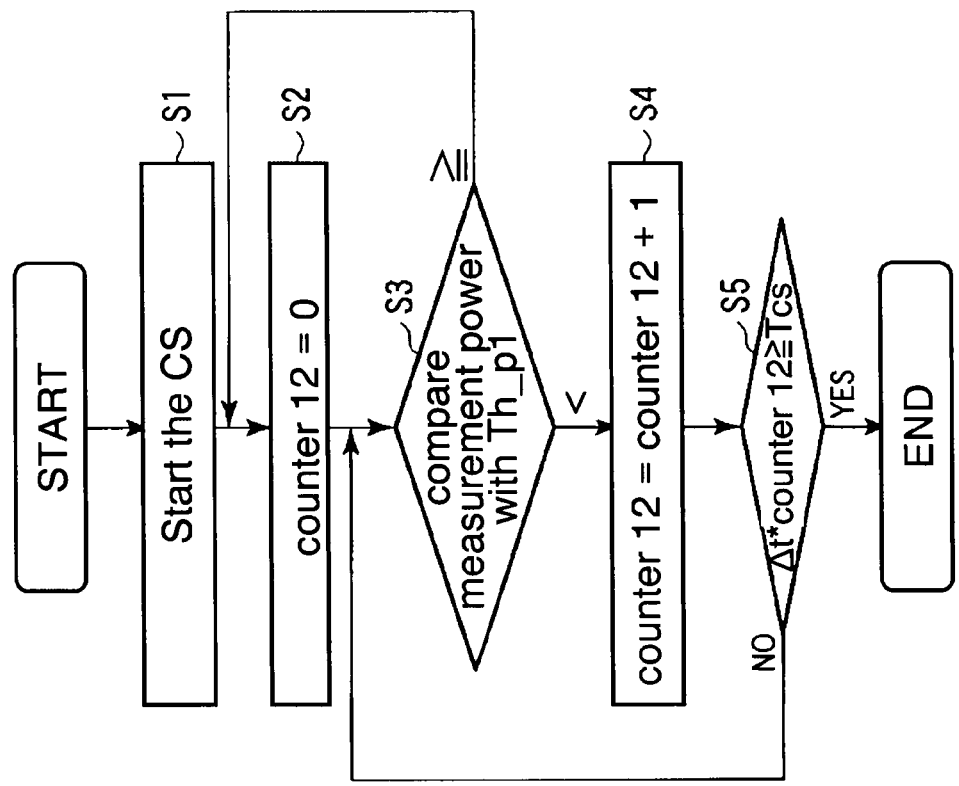
FIG. 9 is a flowchart explaining procedure of the transmitter 101.

Next, we will describe the procedure when the transmitter 101 transmits the signal S1. As shown in FIG. 9, the steps S1-S5 for the CS are same as the first embodiment.

Figure 10:
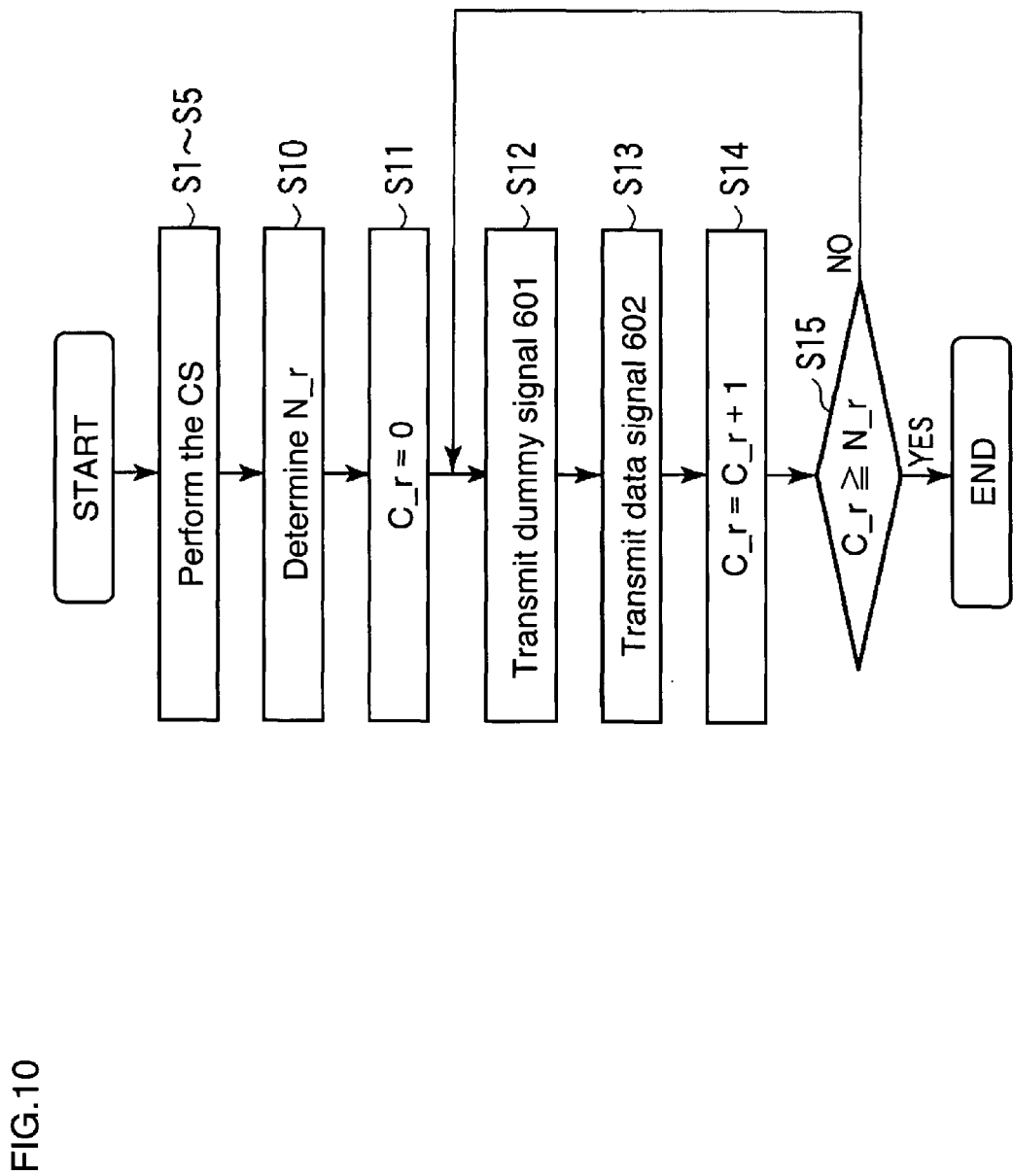
FIG. 10 is a flowchart explaining procedure of the transmitter 101.

As shown in FIG. 10, after completing the CS, the transmitter 101 determines the number of repetition N_r in the step of S10. Next, the transmitter 101 resets a counter C_r to "0" in the step S11. Then, the transmitter 101 transmits the dummy signal 601 in the step S12 and the data signal 602 in the step S13. The counter C_r is incremented in the step S14.

The transmitter 101 compares the counter C_r with the number of repetition N_r in the step S15. If the counter C_r is smaller than the number of repetition N_r, the transmitter 101 transmits the dummy signal 601 in the step S12 and the data signal 602 in the step S13 again. The steps S12-S14 are repeated until that the counter C_r is equal to the repetition N_r in the step S15.

According to the second embodiment, the transmitter 101 transmits the signal S1 several times. Therefore, the receiver 102 can receive the signal S1 more correctly.

Description of the Third Embodiment

Figure 12:
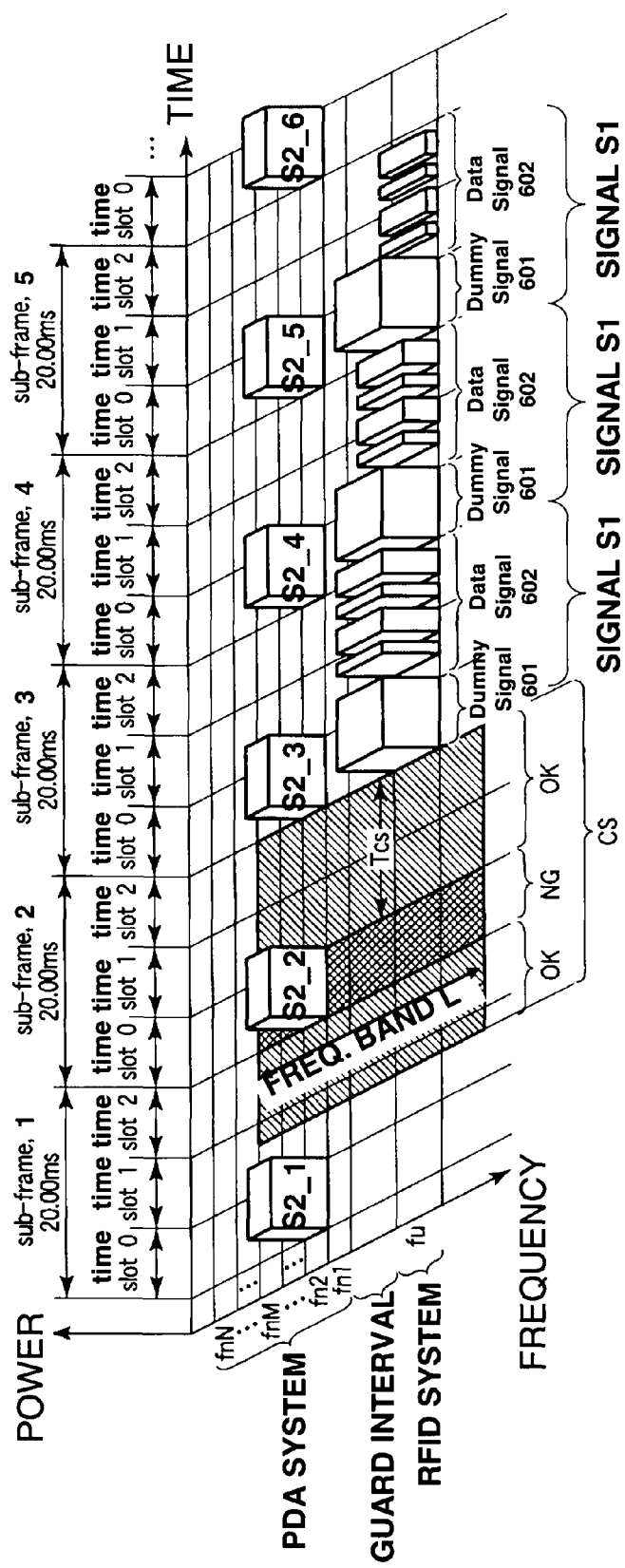
FIG. 12 is a signal sequence which each signal is transmitted using a frequency band in a time slot.

In the third embodiment, a transmitter 301 transmits the signal S1 several times as same as the second embodiment. However, as shown in FIG. 12, the data signal 602 of each signal S1 is transmitted with a different power every transmission.

Figure 11:
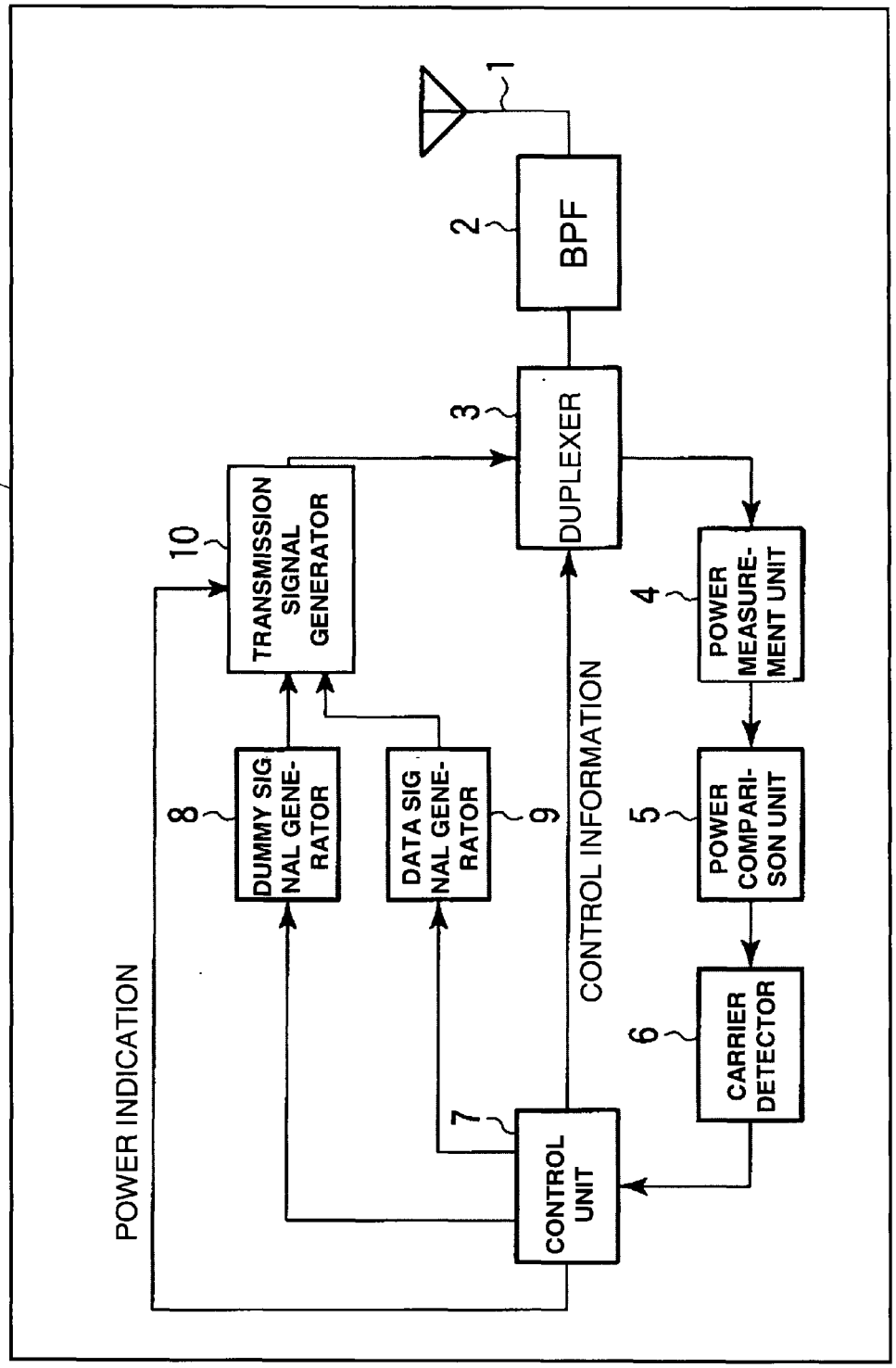
FIG. 11 is a block diagram showing a transmitter 301 according to the third embodiment.

As shown in FIG. 11, in the transmitter 301, the control unit 7 determines the power of each transmission and outputs a power indication to the transmission signal generator 10. The transmission signal generator 10 controls the power according to the power indication.

Figure 13:
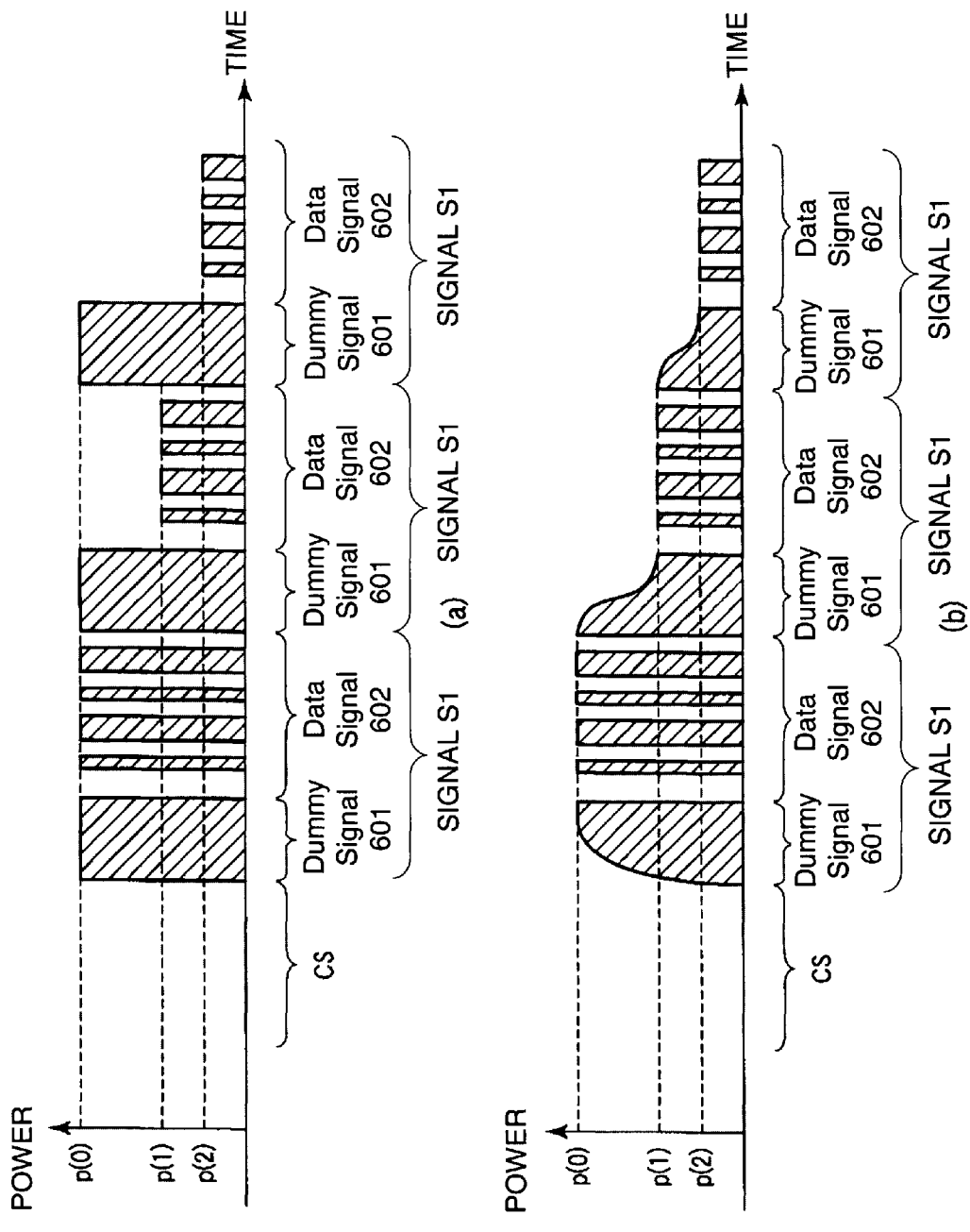
FIG. 13 is a graph showing power level of the signals S1.

As shown in FIG. 13(a), the data signal 602 is transmitted with a power p(0) in the first transmission. A power p(1) is used in the second transmission and a power p(2) is used in the third transmission. Every dummy signals 601 are transmitted with the power p(0). The power p(0) is higher than the powers p(1), p(2). The highest power p(0) could prevent other transmitters from transmitting any signals which interfere to the transmitter 301 during the transmission of the data signals 602.

Moreover, as shown in FIG. 13(b), the power may be changed gradually during transmitting the dummy signal 601. Since the dummy signal 601 is unused in the third embodiment, changing the power during transmission is no problem for the receiver 102.

Figure 14:
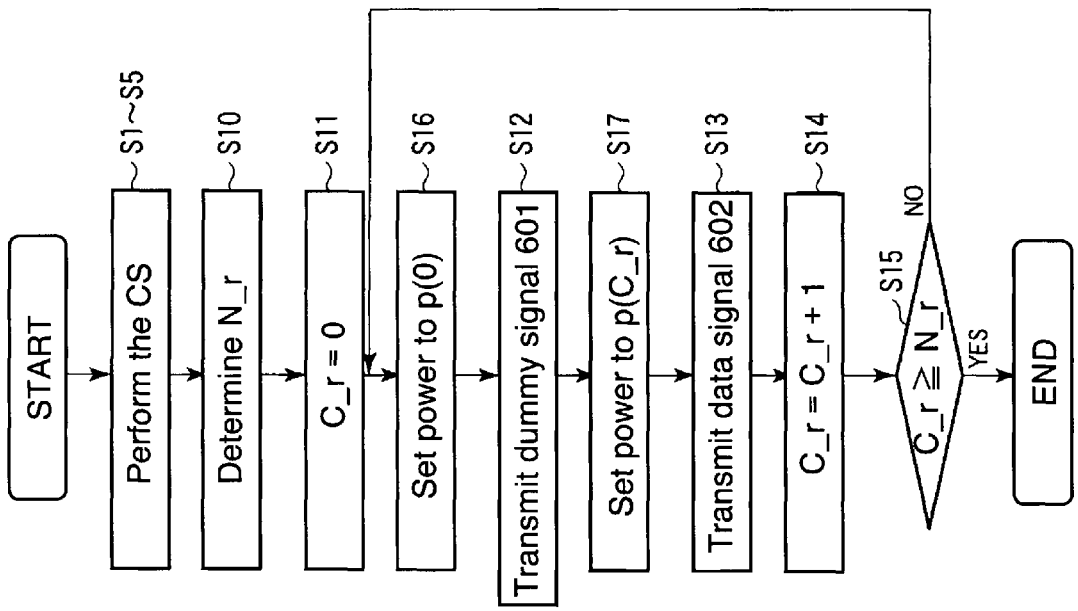
FIG. 14 is a flowchart explaining procedure of the transmitter 301.

As shown in FIG. 14, the procedure when the transmitter 301 transmits is almost same as the second embodiment, except for including the steps S16, S17. The transmitter 301 adjusts the power to be the power p(0) in the step S16. Moreover, the transmitter 301 adjusts the power to be one of the powers p(0),p(1),p(2) depending on the counter C_r in the step S17.

According to the third embodiment, the transmitter 301 transmits the data signal 602 with the different power every transmission. Actually, the best power to receive at the receiver 102 is different depending on a distance between the transmitter 301 and the receiver 102, and a propagation environment. Therefore, the receiver 102 succeeds in receiving the more data signals 602.

Description of the Fourth Embodiment

In the fourth embodiment, the station "A" transmits the signals S2_1, . . . , S2_2 using one time slot 0 every two sub-frames. That is, the station "A" uses lower rate (hereinafter, "half rate") than other embodiments. The transmitter 301 is almost same as the third embodiment except that the transmitter 301 changes the power every two transmissions of the data signal 602.

Figure 15:
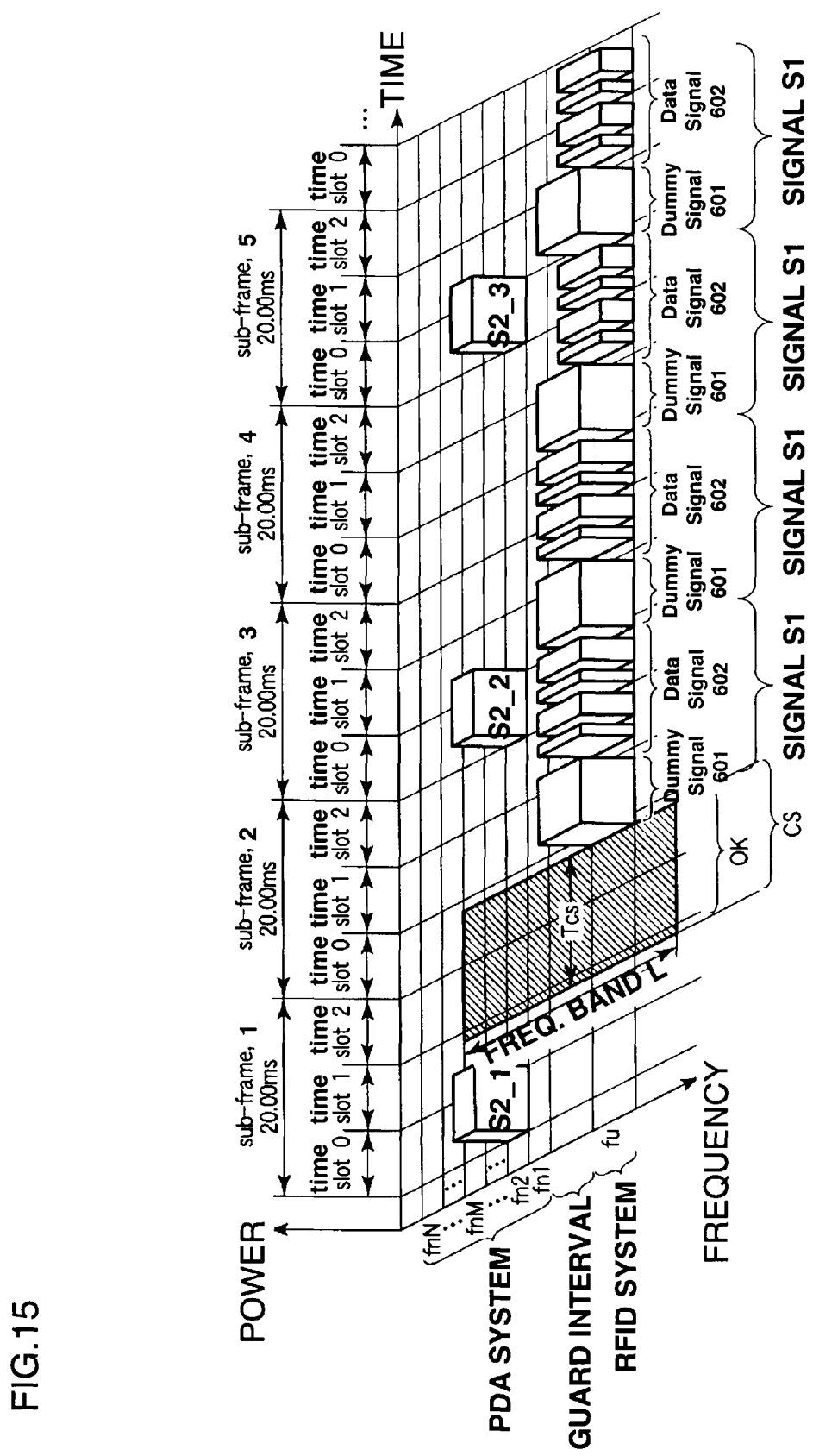
FIG. 15 is a signal sequence which each signal is transmitted using a frequency band in a time slot according to the fourth embodiment.

As shown in FIG. 15, when the station "A" uses the half rate, the signals S2_2, S2_3 can collide with the data signals 602_1, 602_3, respectively. However, either of two data signals 602_1, 602_2 which are transmitted with the same power does not collide with the signal S2_2. Similarly, either of two data signals 602_3, 602_4 does not collide with the signal S2_3.

According to the forth embodiment, the receiver 102 succeeds in receiving the data signal 602 correctly even when the station "A" uses the half rate.

Description of the Fifth Embodiment

Figure 16:
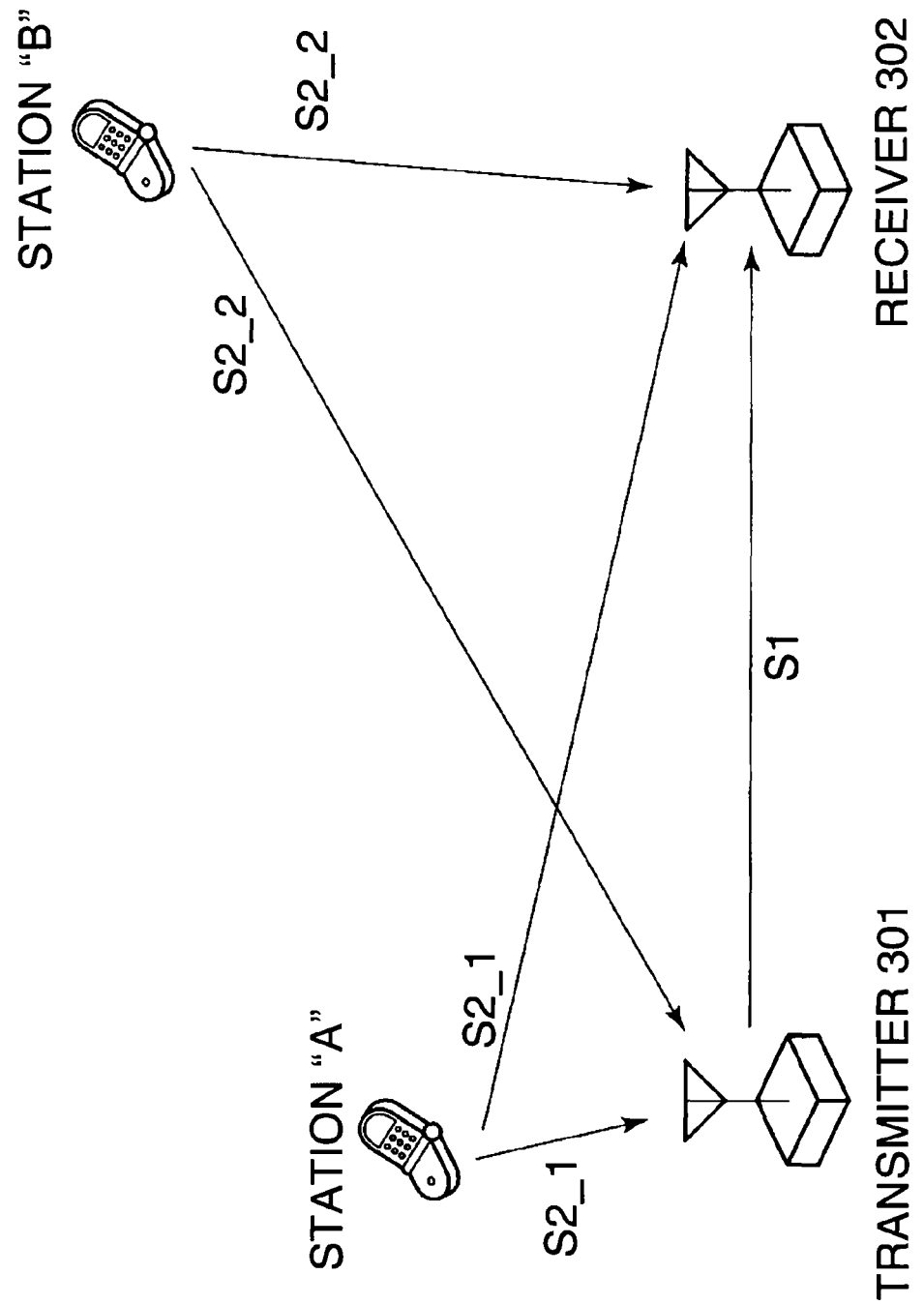
FIG. 16 is a diagram showing an example of the location according to the fifth embodiment.

As shown in FIG. 16, in the fifth embodiment, the PDC system includes two stations "A", "B". The station "A" transmits a signal S2_1. The station "B" transmits a signal S2_2. The RFID system includes a transmitter 301 and a receiver 102. The transmitter 301 transmits the signal S1 to the receiver 102. Both the transmitter 301 and the receiver 102 receive the signal S2_1 and the signal S2_2 as interference. When the transmitter 301 transmits the signal S1 to the receiver 102 at the same time as a transmission of the signal S2_1 and/or the signal S2_2, the receiver 102 may fail to receive the signal S1.

Figure 17:
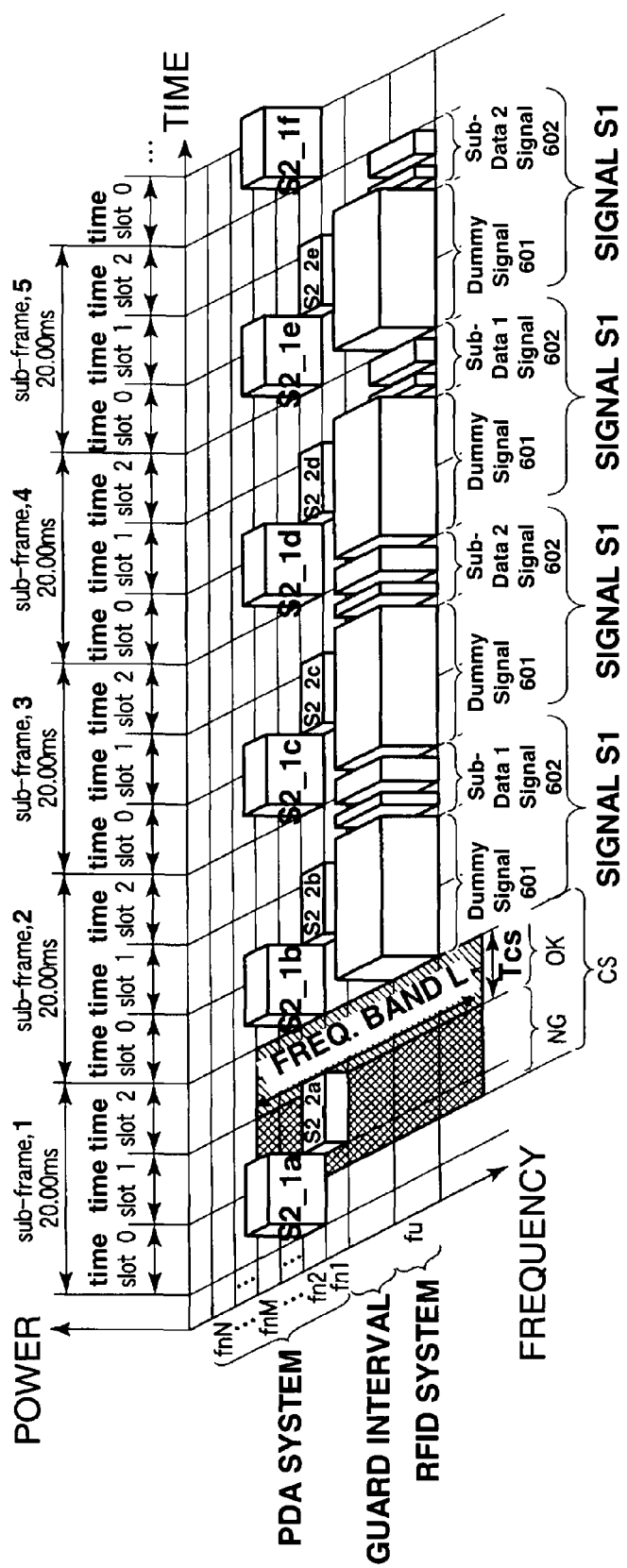
FIG. 17 is a signal sequence which each signal is transmitted using a frequency band in a time slot.

As shown in FIG. 17, the station "A" transmits the signals S2_1a, ..., S2_1f using the frequency band "fn2" in the time slots 0. The station "B" transmits the signal S2_2a, ..., S2_2e using a frequency band "fn1" in the time slots 1. Since the BPF 2 covers the frequency band "L" including the frequency bands "fn1", "fn2" of the PDC system, the transmitter 301 detects the signals S2_1a-f, S2_2a-e by the CS. In this case, only the time slot 2 is idle for the transmitter 301. Therefore, the duration Tcs should be set to duration of the time slot 2. The transmitter 301 transmits the dummy signal 601 which has duration of two time slots. Moreover, the data signal 602 is divided into n sub-data signals (n>=2), each of which has duration of a time slot.

In FIG. 17, the data signal 602 is divided into a sub-data1 signal and a sub-data2 signal (n=2). The transmitter 301 transmits the sub-data1 signal and the sub-data2 signal alternately with the same power. The transmitter 301 transmits a pair of the sub-data1 signal and the sub-data2 signal twice. The transmitter 301 changes the power every pair of the sub-data1 signal and the sub-data2 signal. The stations "A", "B" do not transmit any signals in the time slot 2 during the transmission of the sub-data1 signal and the sub-data2 signal. Therefore, the receiver 102 receives the sub-data1 signal and the sub-data2 signal without interference.

According to the fifth embodiment, the data signal 602 is divided into the sub-data signals depending on the number of the idle time slots. Therefore, the transmitter 301 can transmit the sub-data signals in the idle time slots without the interference. Moreover, the transmitter 301 transmits the dummy signal 601 in the busy time slots. It prevents other transmitter from transmitting any signals. As a result, if at least one time slot is idle, the transmitter 301 can transmits the data signal 602 without the interference.

The sub-data1 signal may include the number of the sub-data signals. Since the receiver 102 knows presence of the sub-data signals following the sub-data1 signal by the number of the sub-data signals, the transmitter 301 can eliminate a header included in the payload 602(c) and the preamble 602(b) for rest of the sub-data signals.

Description of the Sixth Embodiment

A transmitter 501 in the sixth embodiment is almost same as the transmitter 101 in the first embodiment. Only a carrier detector 60 is different from the first embodiment.

Figure 18:
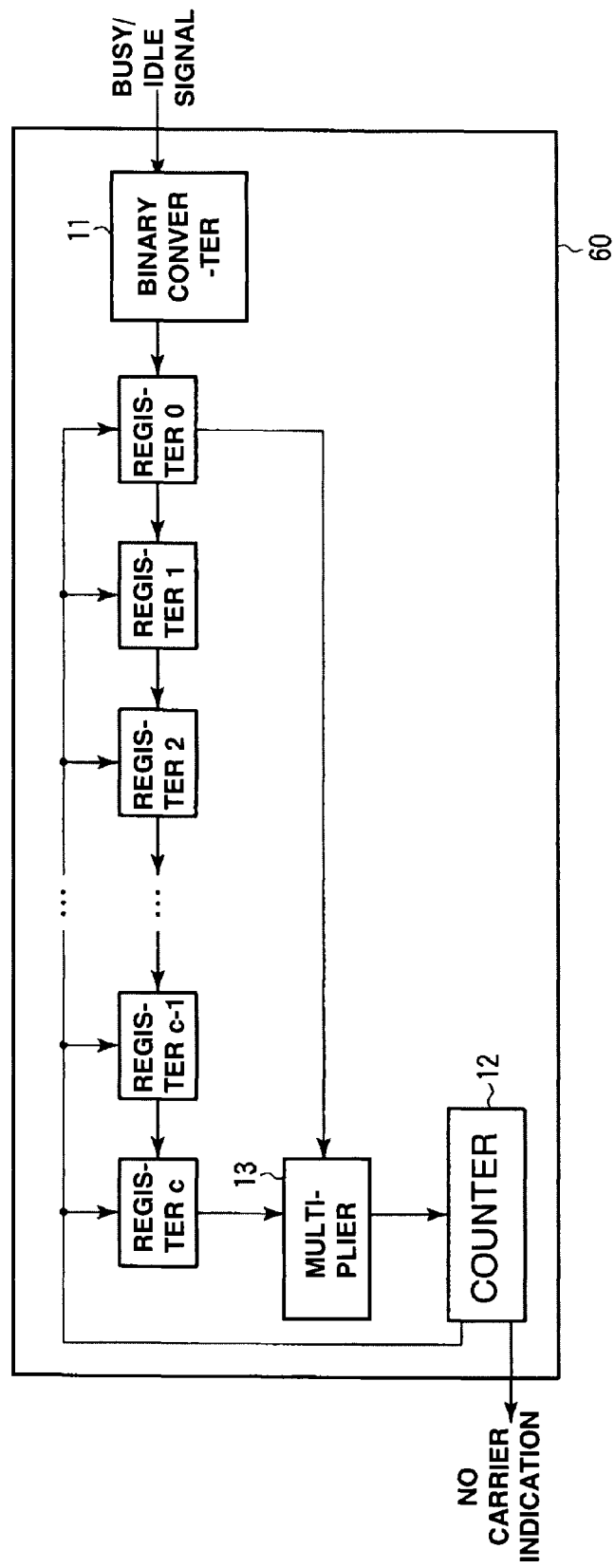
FIG. 18 is a block diagram showing a carrier detector 60 in the transmitter 501 according to the sixth embodiment.

As shown in FIG. 18, the carrier detector 60 includes the binary converter 11, the counter 12, a multiplier 13, and registers 0, 1, ..., c−1, c. The binary converter 11 and the counter 12 are same as the first embodiment.

The resisters 0, 1, ..., c−1, c are reset to "0" before start of the CS. The binary converter 11 inputs a binary code "0" (BUSY) or "1" (IDLE) into the resister 0 at an interval Tinreg. The resister 0 inputs the binary code into the resister 1 and the multiplier 13 at the interval Tinreg. Similarly, the resisters 1, ..., c−1 input the binary code into the next resisters 2, ..., c at the interval Tinreg. At last, the resister c inputs the binary code into the multiplier 13 at the interval Tinreg.

The multiplier 13 multiplies the resistor 0 and the resistor c to obtain an autocorrelation, and outputs the autocorrelation to the counter 12. If the interval Tinreg and the number of the resister c are following (Tinreg*c=Tframe) where Tframe is duration of the sub-frame in the PDC system, the output of the multiplier 13 is "1" when the measurement power is smaller than the threshold Th_p1 for the duration Tframe.

If the counter 12 detects the binary code "1" from the multiplier 13 during the duration Tcs, it determines that the CS has been succeeded. Then, the counter 12 inputs the no carrier indication to the control unit 7. Also, the counter 12 resets the resisters 0, ..., c to "0".

The transmitter 501 detects idle in two sequential frames by the CS using the autocorrelation. Therefore, even if the station "B" transmits the signals S2_2 using a time slot every two sub-frames with the half rate, the transmitter 501 can find the idle time slot in every frame.

Figure 19:
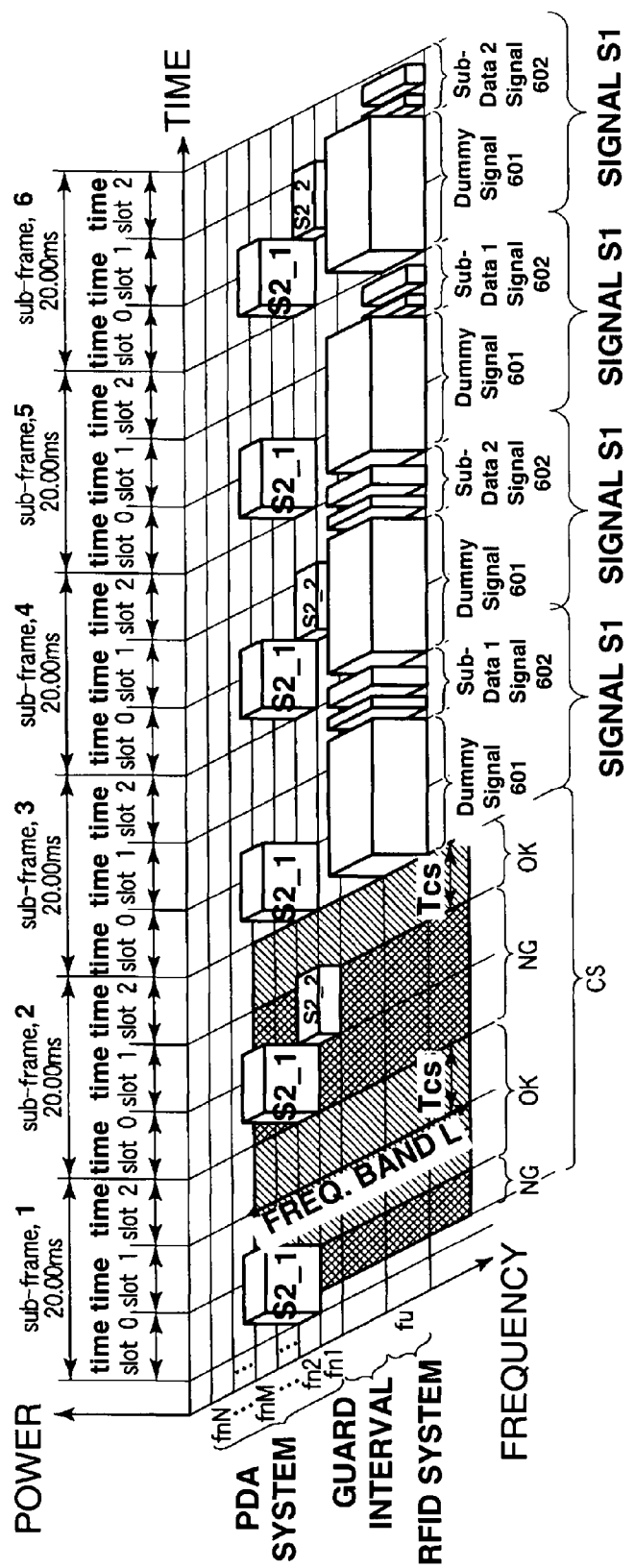
FIG. 19 is a signal sequence which each signal is transmitted using a frequency band in a time slot.

As shown in FIG. 19, the transmitter 501 detects that the time slot 2 is idle in the sub-frames 0, 1 by the CS using the autocorrelation. Then, the transmitter 501 transmits the dummy signal 601 in the time slots 0, 1 and the data signal 602 in the time slots 2.

According to the sixth embodiment, two stations "A", "B" exist in the PDC system. The station "A" transmits the signal S2_1 every sub-frame and the station "B" transmits the signal S2_2 every two sub-frames. Even under the environment above, the transmitter 501 can transmit the signal S1 without interference from the stations "A", "B".

Description of the Seventh Embodiment

Figure 20:
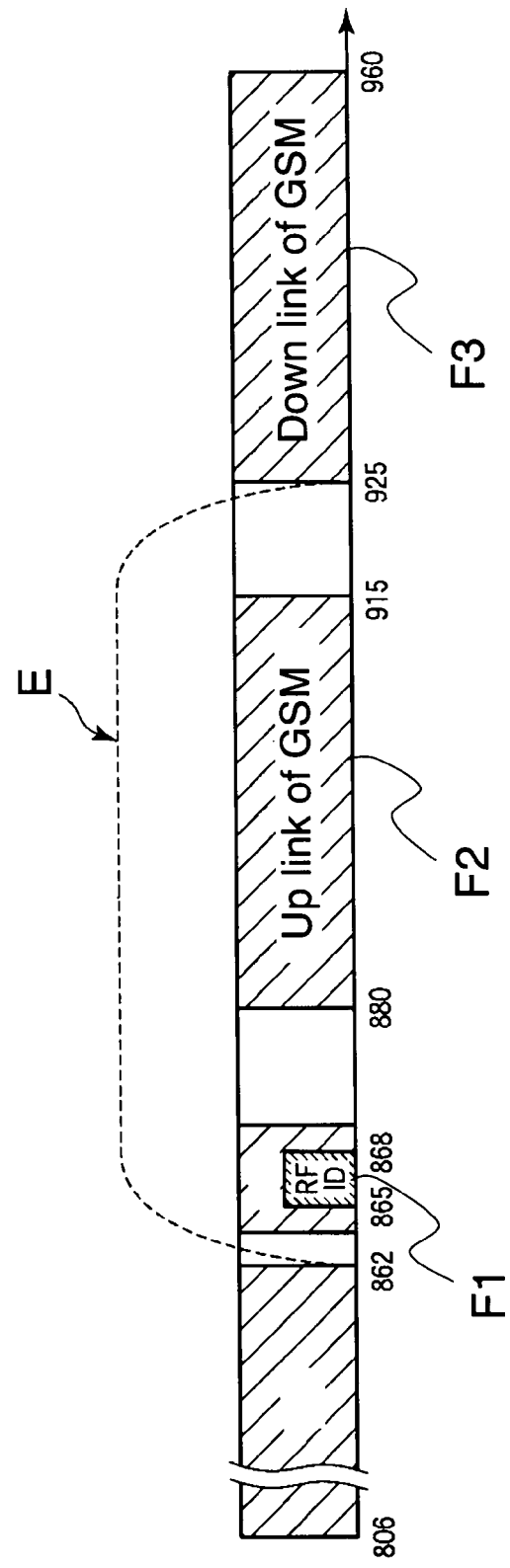
FIG. 20 is a diagram showing an example of frequency allocation according to the seventh embodiment.

As shown in FIG. 20, in Europe, a frequency band "F1" from 865 MHz to 868 MHz is allocated to the RFID system. Frequency bands "F2", "F3", which are close to the frequency band "F1", are allocated to an uplink and a downlink of a GSM (Global System for Mobile Communications). The GSM performs TDMA.

A transmitter 701 and a receiver 702 in the RFID system adopt the BPF which lets a frequency component of a signal within a frequency band "E" pass. The frequency band "E" includes the frequency band "F2" which is used by the GSM. Moreover, the transmitter 701 performs the CS with the duration Tcs before transmitting the signal S1 over the frequency band "E".

Figure 21:
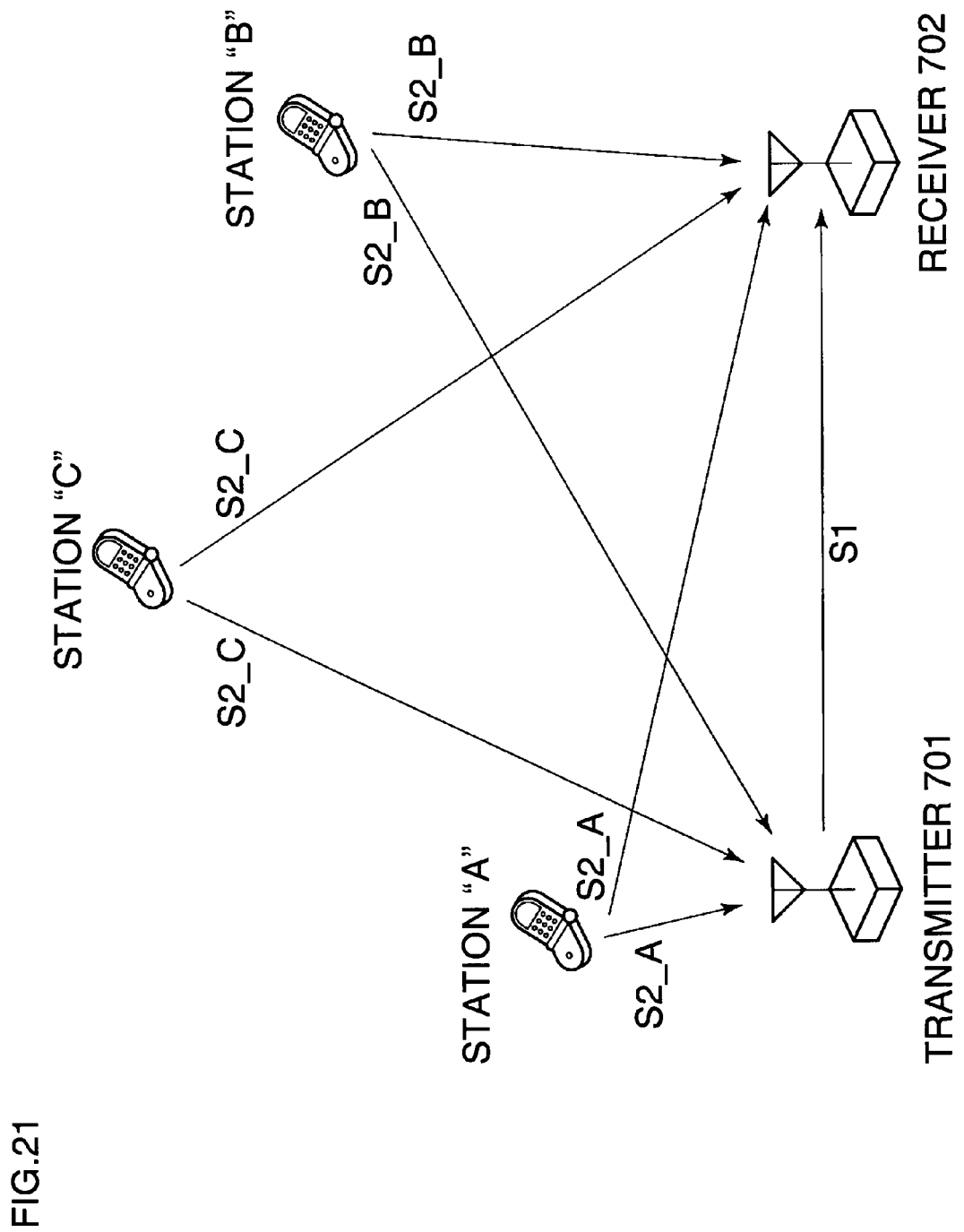
FIG. 21 is a diagram showing an example of the location.

As shown in FIG. 21, in the seventh embodiment, the GSM includes three stations "A", "B", "C". The stations "A", "B", "C" transmit signals S2_A, S2_B, S2_C, respectively. The RFID system includes the transmitter 701 and the receiver 702.

The transmitter 701 transmits the signal S1 to the receiver 702. Both the transmitter 701 and the receiver 702 receive the signals S2_A, S2_B, S2_C as interference. If the transmitter 701 transmits the signal S1 to the receiver 702 at the same time as a transmission of at least one of the signals S2_A, S2_B, S2_C, the receiver 702 may fail to receive the signal S1.

Figure 22:
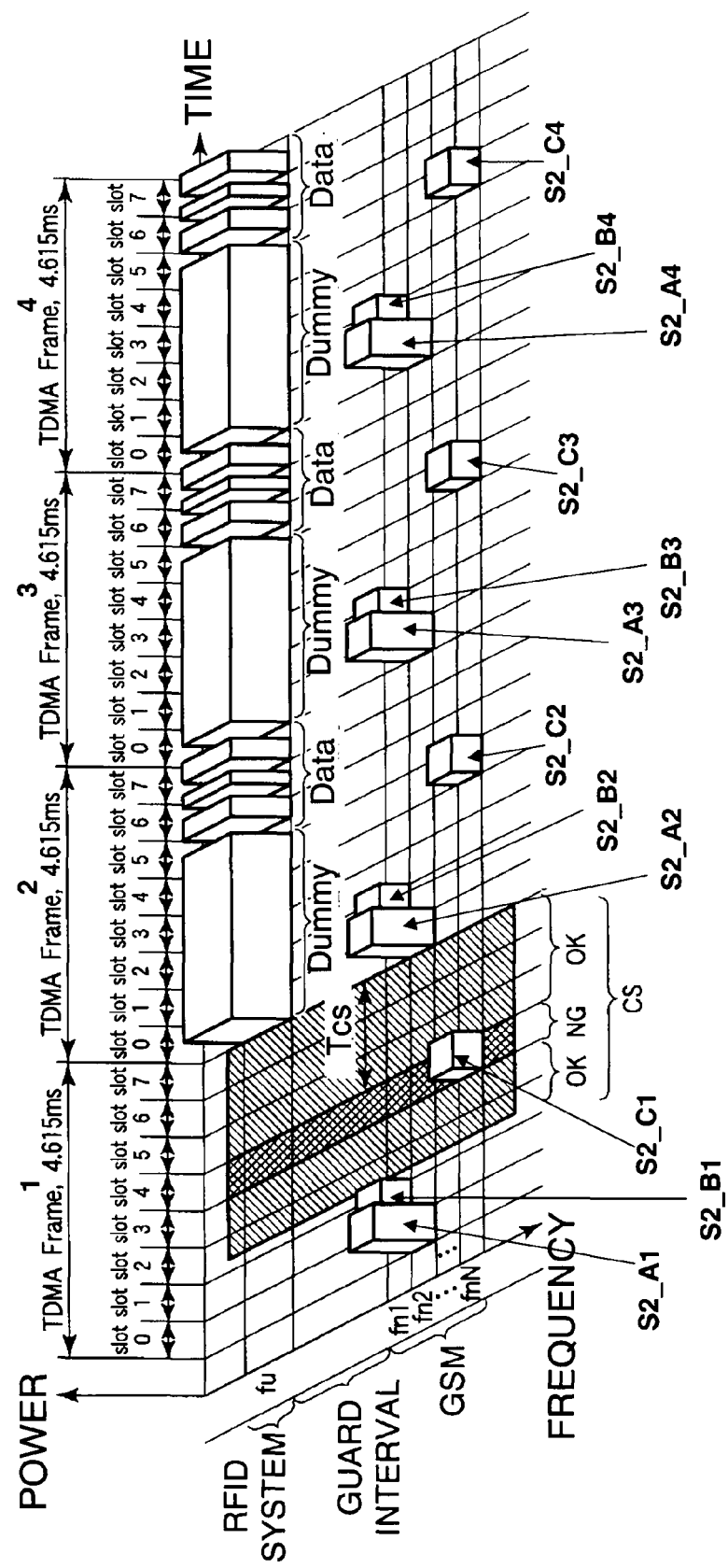
FIG. 22 is a signal sequence which each signal is transmitted using a frequency band in a time slot.

As shown in FIG. 22, time is divided into TDMA-frames of 4.615 [ms] in the GSM. Each TDMA-frame includes eight time slots 0-7. In this seventh embodiment, the station "A" transmits the signals S2_A1, ..., S2_A4 using the frequency band "fn2" in the time slots 0. The station "B" transmits the signals S2_B1, ..., S2_B4 using the frequency band "fn1" in the time slots 1. The station "C" transmits the signals S2_C1, ..., S2_C4 using a frequency band "fnN" in the time slots 4. The transmitter 701 transmits the signal S1 using the frequency band "fu".

The transmitter 701 performs the CS with the duration Tcs before transmitting the signal S1 for the duration Tcs which is duration for three time slots. Since the BPF covers the frequency band "E" including the frequency bands "fn1, 2, ..., N" of the GSM, the transmitter 701 detects the signal S2_C1 by the CS.

When the time slot 4 starts during the CS, the transmitter 701 detects the power of the signal S2_C1 and wait until the time when the frequency band "E" turns to be idle. The frequency band "E" becomes idle at the time slot 5 and the idle continues for the duration Tcs until the end of the time slot 7. After detecting idle for the duration Tcs, the transmitter 701 transmits the dummy signal 601 which has duration for the five time slots. Then, the transmitter 701 transmits the data signal 602 in the time slots 5-7. The dummy signal 601 prevents other transmitters in the RFID system from transmitting any signals.

According to the seventh embodiment, the stations "A", "B", "C" do not transmit any signals in the time slots 5-7 while the transmitter 702 transmits the data signal 602. Therefore, the receiver 702 succeeds in receiving the data signal 602 without interference from the stations "A", "B", "C".

Description of the Eighth Embodiment

In the above embodiments, the duration of the data signal 602 is fixed. When the GSM is crowded, the transmitter in the RFID system may not acquire the idle time slots which are enough to transmit the duration of the data signal 602. For example, in the seventh embodiment, since the duration of the data signal 602 is equal to the duration of three time slots, the transmitter 701 acquires three time slots. However, if only one or two time slots is idle, the transmitter 701 has to wait for transmit until more time slots becomes idle.

On the other hand, even when more time slots are idle than the duration of the data signal 602, the transmitter 701 uses only three time slots. Therefore, usage efficiency of the frequency band may degrade.

In this eighth embodiment, a transmitter 801 acquires the time slots which the number of the time slots is determined depending on the duration of the idle time due to the CS. Since the duration of the data signal 602 is not fixed, information of the duration of the data signal 602 is included in the data signal 602.

Figure 23:
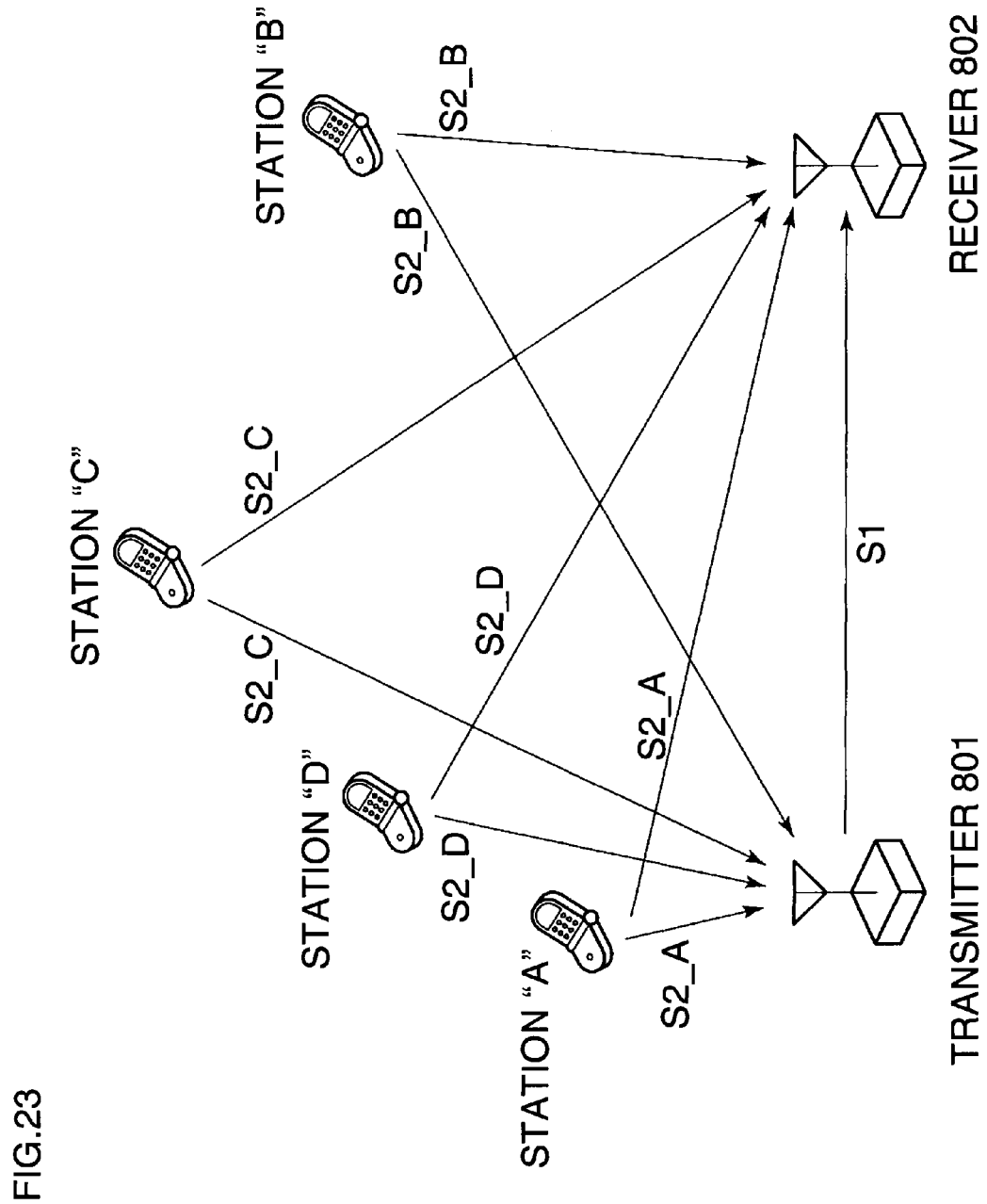
FIG. 23 is a diagram showing an example of the location according to the eighth embodiment.

As shown in FIG. 23, in the eighth embodiment, the GSM includes four stations "A", "B", "C", "D". The stations "A", "B", "C", "D" transmit signals S2_A, S2_B, S2_C, S2_D, respectively. The RFID system includes the transmitter 801 and a receiver 802. The transmitter 801 and the receiver 802 are almost same as these of the seventh embodiment except for a carrier detector 250 and a control unit 251 (described later). The transmitter 801 transmits a signal S8 (described later) to the receiver 802. Both the transmitter 801 and the receiver 802 receive the signals S2_A, S2_B, S2_C, S2_D as interference. If the transmitter 801 transmits the signal S8 to the receiver 802 at the same time as a transmission of at least one of the signals S2_A, S2_B, S2_C, S2_D, the receiver 802 may fail to receive the signal S8.

Figure 26:
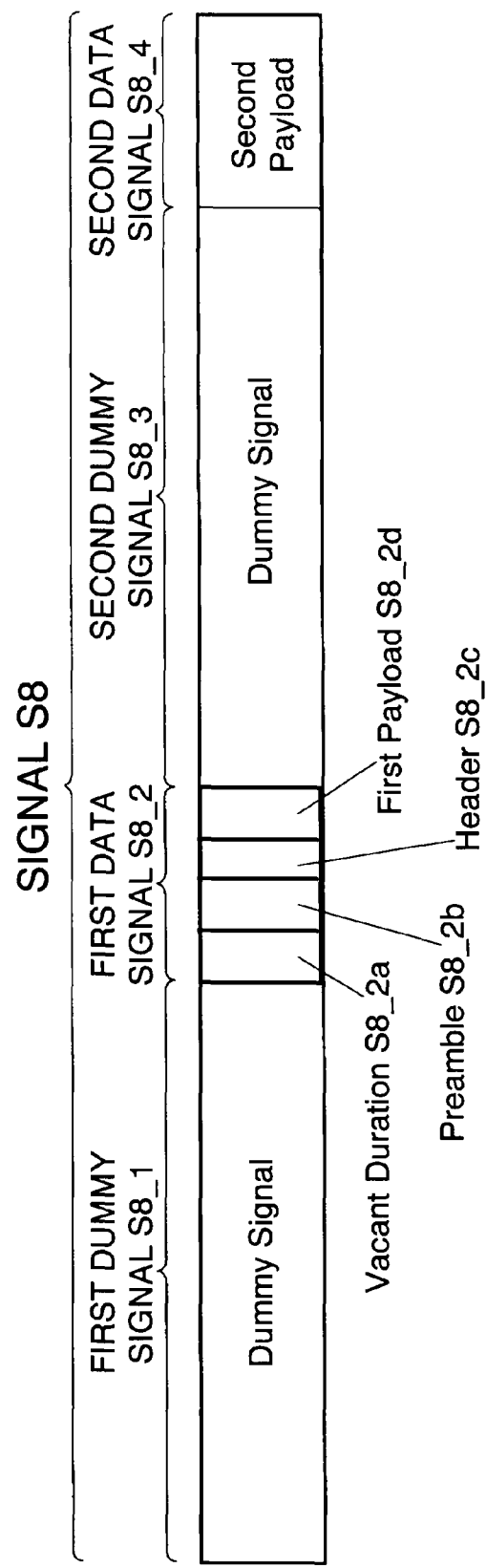
FIG. 26 shows a structure of a signal S8.

As shown in FIG. 26, the signal S8 includes a first dummy signal S8_1, a first data signal S8_2, a second dummy signal S8_3 and a second data signal S8_4. The first and second dummy signals S8_1, S8_3 are unused as same as the dummy signal 601 in the first embodiment. For example, they may be pulse signals. The first data signal S8_2 includes a vacant duration S8_2a, a preamble S8_2b, a header S8_2c, and a first payload S8_2d. The second data signal S8_4 includes a second payload. In addition to the second payload, the second data signal S8_4 may include at least one of the vacant duration, a preamble, and a header.

The receiver 802 easily detects a start of the preamble S8_2b, since the vacant duration S8_2a exists before it. Moreover, the receiver 802 detects the signal S8 and estimates a condition of the frequency band due to the preamble S8_2b. The condition is used to decode of the first and second payloads. The first and second payloads include data. The header S8_2c includes duration of the first and second data signals S8_2, S8_4. Therefore, the receiver 802 obtains the duration of the first and second data signals S8_2, S8_4 from the header S8_2c and uses it to decode the first and second data signals S8_2, S8_4.

Figure 24:
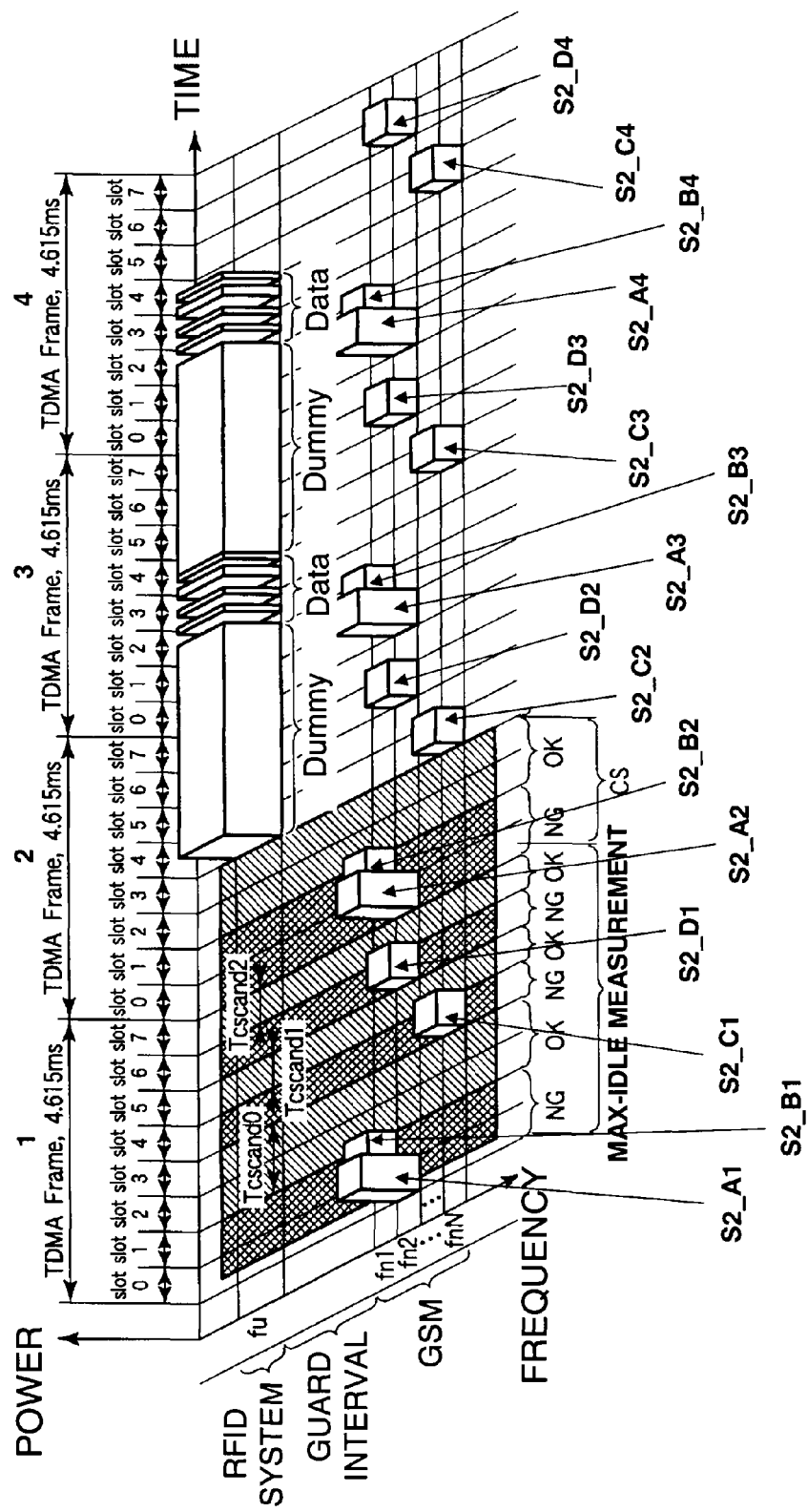
FIG. 24 is a signal sequence which each signal is transmitted using a frequency band in a time slot.

As shown in FIG. 24, time is divided into TDMA-frames of 4.615 [ms] in the GSM. Each TDMA-frame includes eight time slots 0-7. In the eighth embodiment, the station "A" transmits the signals S2_A1, ..., S2_A4 using a frequency band "fn2" in the time slots 0. The station "B" transmits the signals S2_B1, ..., S2_B4 using a frequency band "fn1" in the time slots 1. The station "C" transmits the signals S2_C1, ..., S2_C4 using a frequency band "fnN" in the time slots 4. The station "D" transmits the signals S2_D1, ..., S2_D4 using the frequency band "fn2" in the time slots 6. The transmitter 801 transmits the signal S8 using a frequency band "fu".

We will describe construct of the transmitter 801 below, especially, the carrier detector 250 and the control unit 251. In the eighth embodiment, the carrier detector 250 performs a measurement of a maximum idle duration which is not used by stations "A", "B", "C", "D" of the GSM (hereinafter, "max-idle measurement") and the CS. First, the carrier detector 250 performs the max-idle measurement for duration Tcslim and sets the duration Tcs to the maximum idle duration detected in the duration Tcslim. For example, the duration Tcslim equals to duration of a TDMA-frame (4.615 [msec]). Next, the carrier detector 250 performs the CS with the duration Tcs. After the carrier detector 250 detects idle for the duration Tcs, the signal S8 is transmitted.

The control unit 251 determines the duration of the first data signal S8_2 and the second data signal S8_4 depending on the maximum idle duration (=the duration Tcs).

Figure 25:
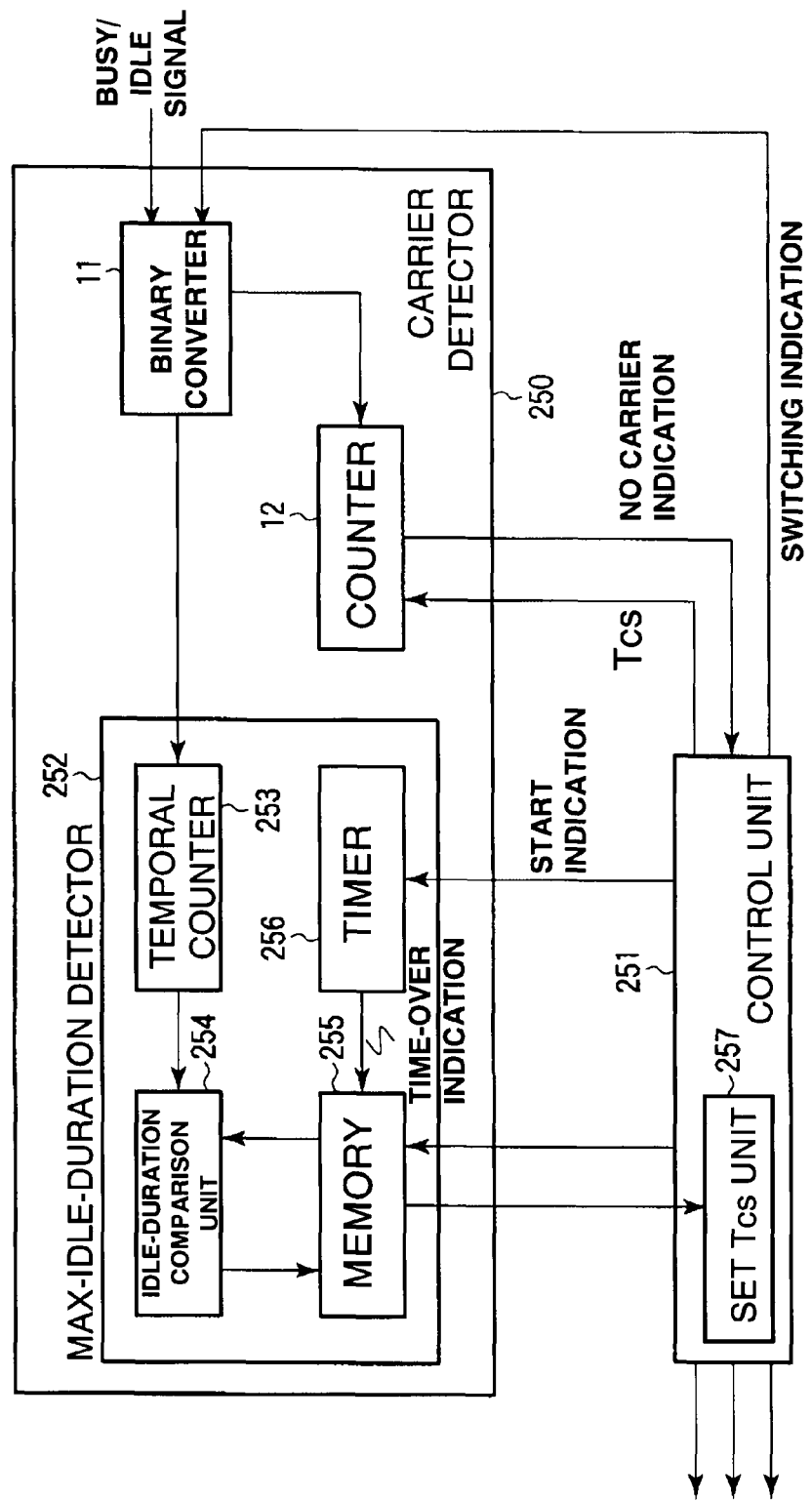
FIG. 25 is a block diagram showing a carrier detector 250 and a control unit 251 in the transmitter 801.

As shown in FIG. 25, the carrier detector 250 includes a binary converter 11, a counter 12, and a max-idle-duration detector 252. The binary converter 11 and the counter 12 are almost same as the first embodiment. The max-idle-duration detector 252 includes a temporal counter 253, an idle-duration comparison unit 254, a memory 255, and a timer 256.

The binary converter 11 converts the input signal, which is the BUSY or IDLE signal from the power comparison unit 5, to a binary code "0" or "1". When the input is the BUSY signal, the binary converter 11 outputs "0" to the counter 12 or the temporal counter 253 according to a switching indication from the control unit 251. The switching indication indicates which the carrier detector 250 performs the max-idle measurement or the CS. If the switching indication indicates to perform the max-idle measurement, the binary converter 11 outputs "0" to the temporal counter 253. On the other hand, if the switching indication indicates to perform the CS, the binary converter 11 outputs "0" to the counter 12. When the input is the IDLE signal, the binary converter 11 outputs "1" to the counter 12 or the temporal counter 253 according to the switching indication from the control unit 251. If the switching indication indicates to perform the max-idle measurement, the binary converter 11 outputs "1" to the temporal counter 253. On the other hand, if the switching indication indicates to perform the CS, the binary converter 11 outputs "1" to the counter 12.

For performing the CS, the counter 12 operates as same as the first embodiment. The counter 12 counts input of the binary code of "1" from the binary converter 11. Then, the counter 12 calculates the idle time (=Δt*the counter 12). The counter 12 compares the idle time with the duration Tcs. If the idle time is equal or larger than the duration Tcs, it means that the frequency band "E" has not been used for more than the duration Tcs. Therefore, the counter 12 outputs the no carrier indication to the control unit 251. In the eighth embodiment, the counter 12 obtains the value of the duration Tcs from the control unit 251.

The temporal counter 253 counts input of the binary code of "1" from the binary converter 11. When the input of the binary code turns to "0" from "1", the temporal counter 253 outputs own value to the idle-duration comparison unit 254.

The idle-duration comparison unit 254 compares the value of the temporal counter 253 with the value of the memory 255. The memory 255 has been initialized to "0". If the value of the temporal counter 253 is larger than the value of the memory 255, the idle-duration comparison unit 254 stores the value of the temporal counter 253 in the memory 255. On the other hand, if the value of the temporal counter 253 is smaller than the value of the memory 255, the idle-duration comparison unit 254 does not do anything for the memory 255.

As a result, the memory 255 memorizes a maximum value of the temporal counter 253. Moreover, the memory 255 outputs own value to the control unit 251 when it receives a time-over indication from the timer 256.

The timer 256 starts to measure time when a start indication receives from the control unit 251. The start indication indicates to start performing the max-idle measurement. When the measured time is equal to the duration Tcslim, the timer 256 outputs the time-over indication to the memory 255.

The control unit 251 outputs the start indication to the timer 256 and initialize the memory 255 to "0" when it starts performing the max-idle measurement. Moreover, the control unit 251 obtains the value of the memory 255. The control unit 251 outputs the switching indication to the binary converter 11. The control unit 251 outputs the value of the time Tcs to the counter 12.

The control unit 251 includes a set Tcs unit 257. The set Tcs unit 257 determines the value of the duration Tcs based on the value of the memory 255. The control unit 251 outputs the duration Tcs to the data signal generator 9. Then, the data signal generator 9 generates the first and second data signals S8_2, S8_4 which each has the duration Tcs. Moreover, the set Tcs unit 257 determines the duration Td of the first and second dummy signals S8_1, S8_3 based on the time Tcs. The duration Td may be that the duration of a TDMA-frame (4.615 [msec]) minus the duration Tcs. The control unit 251 outputs the duration Td to the dummy signal generator 8. Then, the dummy signal generator 8 generates the first and second dummy signals S8_1, S8_3.

The max-idle-duration detector 252 performs the max-idle measurement for the duration Tcslim. In FIG. 24, the duration Tcslim equals to duration of a TDMA-frame (4.615 [msec]).

The max-idle-duration detector 252 starts to perform the max-idle measurement at middle of the time slot 0 of the TDMA-frame 1 and ends at the middle of the time slot 0 of the TDMA-frame 2. The max-idle-duration detector 252 detects idle in the time slots 2, 3, 5, 7. The duration of the time slots 2, 3 is Tcscand0. The duration of the time slots 5 is Tcscand1 and the duration of the time slots 7 is Tcscand2. Since the maximum idle duration is Tcscand0 among Tcscand0-2, the max-idle-duration detector 252 outputs the Tcscand0 to the set Tcs unit 257.

The set Tcs unit 257 sets the duration Tcs to the Tcscand0 for the CS and for the duration of the first and second data signals S8_2, S8_4. The transmitter 801 performs the CS and detects idle for the duration Tcs in the time slots 2, 3. Next, the transmitter 801 transmits the first dummy signal S8_1 with the duration Td and the first data signal S8_2 with the duration Tcs. Then, the transmitter 801 transmits the second dummy signal S8_3 with duration Td and the second data signal S8_4 with duration Tcs.

Next, we will describe a procedure when the transmitter 801 transmits the signal S8.

Figure 27:
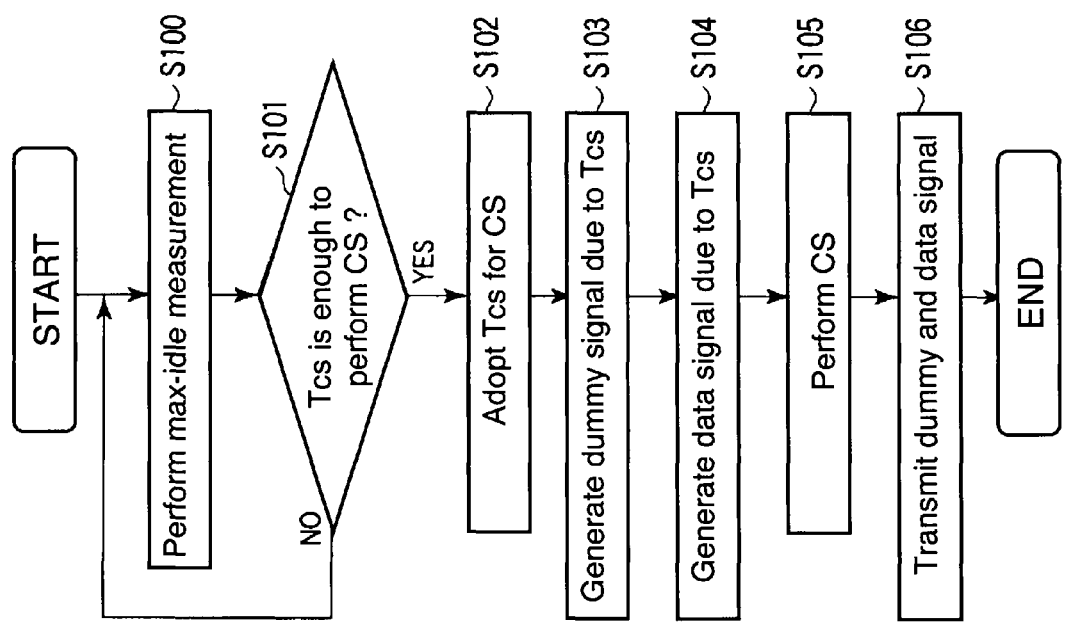
FIG. 27 is a flowchart explaining procedure of the transmitter 801.

As shown in FIG. 27, when a request to transmit the data is generated, the transmitter 801 performs the max-idle measurement in the step S100. Next, the transmitter 801 checks whether the duration Tcs obtained in the step S100 is enough to perform the CS in the step S101. If the Tcs is enough to perform the CS, the transmitter 801 adopts Tcs for the CS in the step S102. Then the transmitter 801 generates the first and second dummy signals S8_1, S8_3 due to Tcs in the step S103, and generates the first and second data signals S8_2, S8_4 due to Tcs in the step S104. At last, the transmitter 801 performs the CS with the duration Tcs in the step S105, and transmits the first and second dummy signals S8_1, S8_3 and the first and second data signals S8_2, S8_4 in the step 106.

Figure 28:
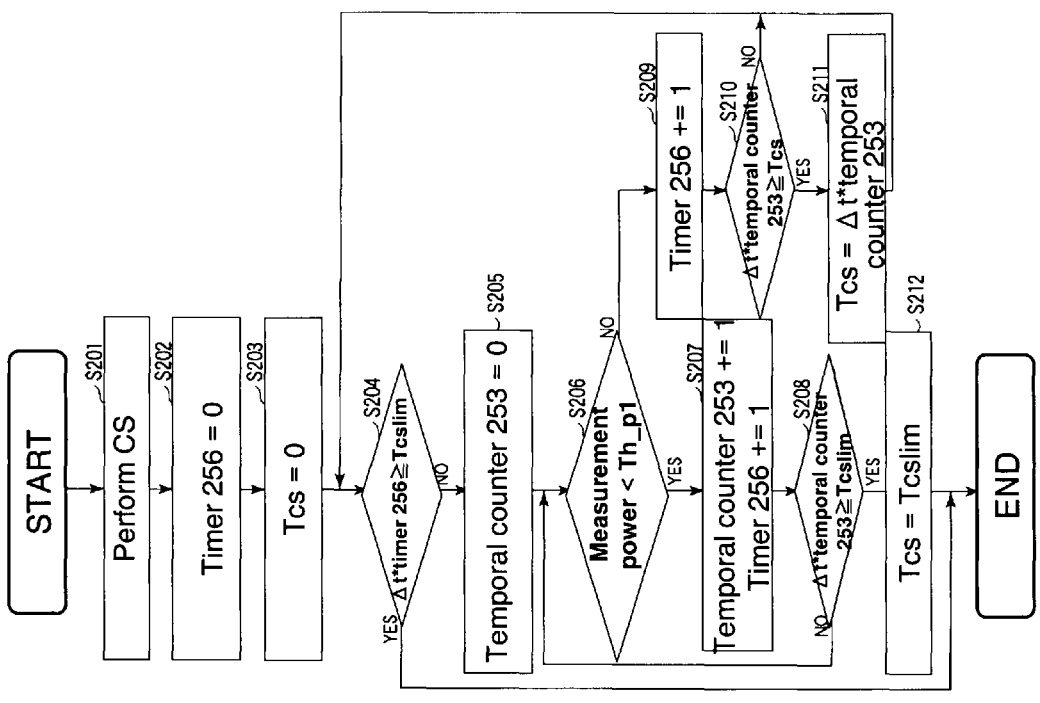
FIG. 28 is a flowchart explaining procedure of the transmitter 801.

FIG. 28 shows detail of the max-idle measurement in the step S100 of FIG. 27. First, the transmitter 801 performs the CS in the step S201. Next, the transmitter 801 initializes the timer 256 to "0" in the step S202. In the step S203, the duration Tcs is initialized to "0". Then, the transmitter 801 compares the timer 256 with the duration Tcslim in the step S204. If the timer 256 is smaller than the duration Tcslim, the temporal counter 253 is set to "0" in the step S205. Next, the transmitter 801 compares the measurement power with the threshold Th_p1 in the step S206.

If the measurement power is smaller than the threshold Th_p1, the temporal counter 253 and the timer 256 are incremented respectively in the step S207. Then, the transmitter 801 compares the idle time (the duration Δt*the temporal counter 253) with the duration Tcslim in the step S208. If the idle time is larger than the duration Tcslim, the transmitter 801 sets the duration Tcs to the duration Tcslim in the step S212. On the other hand, the measurement power is equal or larger than the threshold Th_p1, the timer 256 is incremented in the step S209. Then, the transmitter 801 compares the idle time (the duration Δt*the temporal counter 253) with the duration Tcs in the step S210. If the idle time is larger than the duration Tcs, the transmitter 801 updates the duration Tcs to the idle time (the duration Δt*the temporal counter 253).

According to the eighth embodiment, the transmitter 801 performs the max-idle measurement to obtain the maximum idle duration Tcs and the duration of the data signal is set to the duration Tcs. Therefore, the transmitter 801 can transmit the data signal depending on the congestion of the frequency band "E" to be higher usage efficiency.

Although the eighth embodiment is based on the first embodiment, the max-idle measurement can be performed based on other embodiments. In the case of being based on the fifth embodiment, the transmitter 801 can divide the data signal into the sub-data signals depending on the maximum idle duration Tcs.

Description of the Ninth Embodiment

A transmitter 901 in the ninth embodiment is almost same as the transmitter 101 in the first embodiment except for structure of a signal S9.

Figure 29:
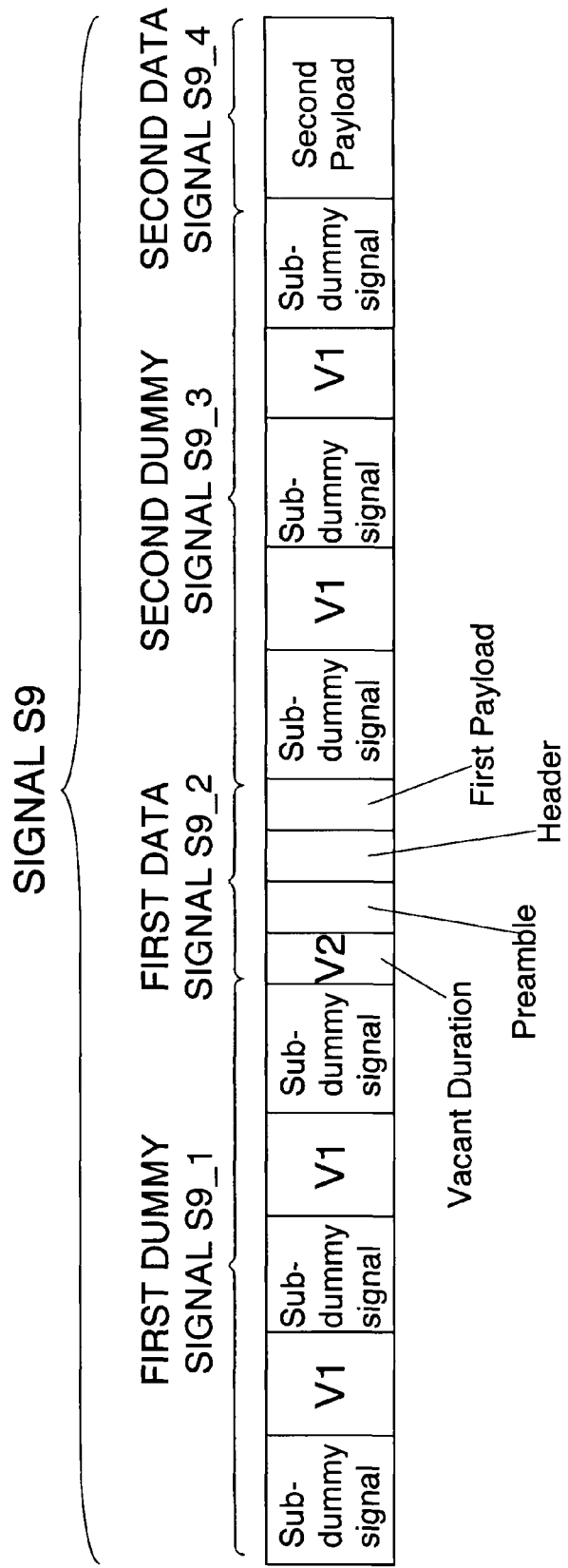
FIG. 29 shows a structure of a signal S9 according to the ninth embodiment.

As shown in FIG. 29, first and second dummy signals S9_1, S9_3 in the signal S9 are divided into several sub-dummy signals and inserted a vacant duration V1 between two adjacent sub-dummy signals. Duration of the vacant duration Tnull is shorter than the duration Tcs.

Since the transmitter 901 does not need to continues consuming power during the first and second dummy signals S9_1, S9_3 by inserting the vacant duration V1, it can reduce power consumption with keeping to prevent other transmitters from transmitting any signals. Moreover, duration of the vacant duration V2 in a first data signal S9_2 is also better to be shorter than the duration Tcs in order to prevent other transmitters from transmitting any signals.

Description of the Tenth Embodiment

A transmitter 1001 in the tenth embodiment is almost same as the transmitter 101 in the first embodiment except for structure of a signal S10.

Figure 30:
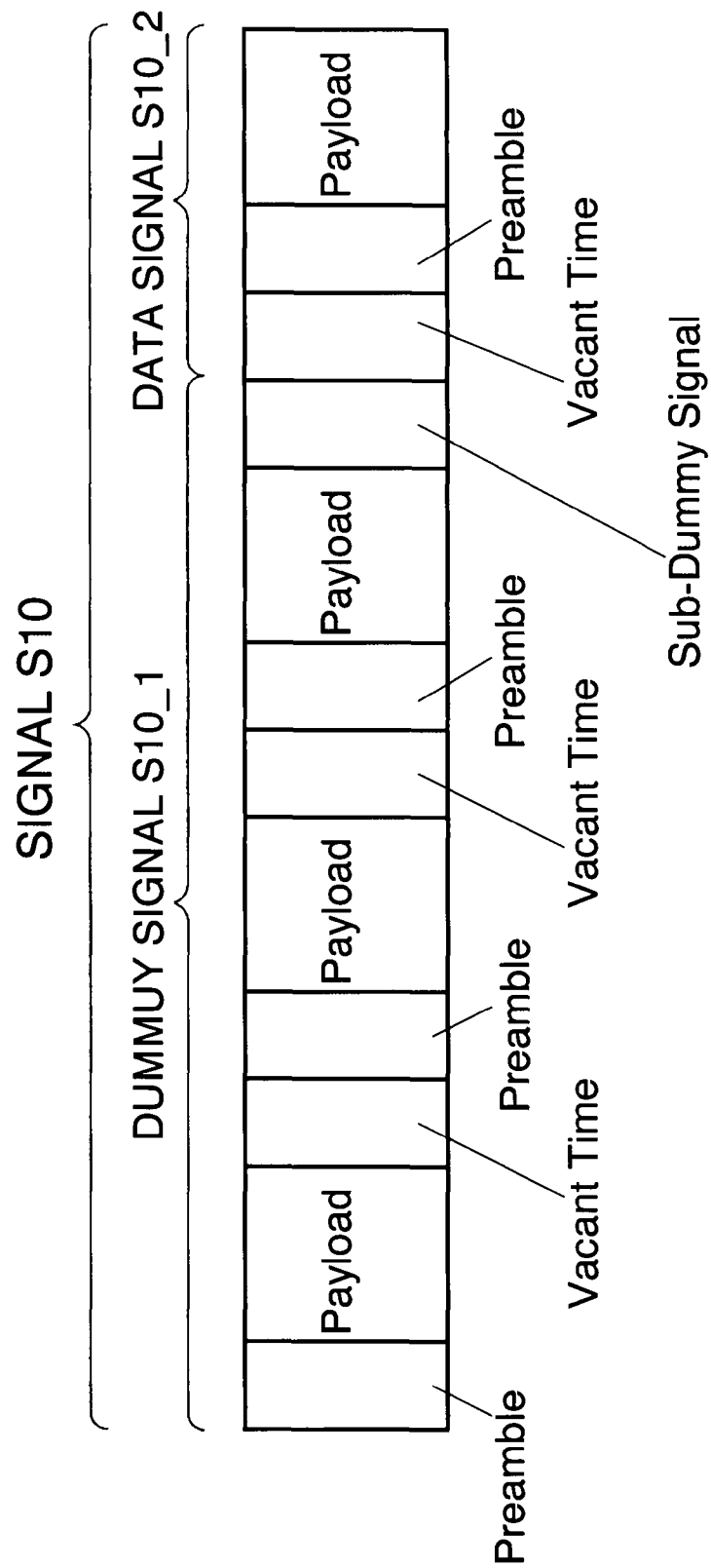
FIG. 30 shows a structure of a signal S10 according to the tenth embodiment.

As shown in FIG. 30, a dummy signal S10_1 includes at least a preamble, a payload, a vacant time, and a sub-dummy signal.

When the other system does not exist near the transmitter 1001 and the receiver 102, the receiver 102 can receives the preamble and the payload in the dummy signal S10_1. Therefore, the receiver 102 can obtain the data in the payload earlier.

On the other hand, when other system exists near the transmitter 1001 and the receiver 102, the receiver 102 can receives the preamble and the payload in the data signal S102.

Description of the Eleventh Embodiment

Figure 31:
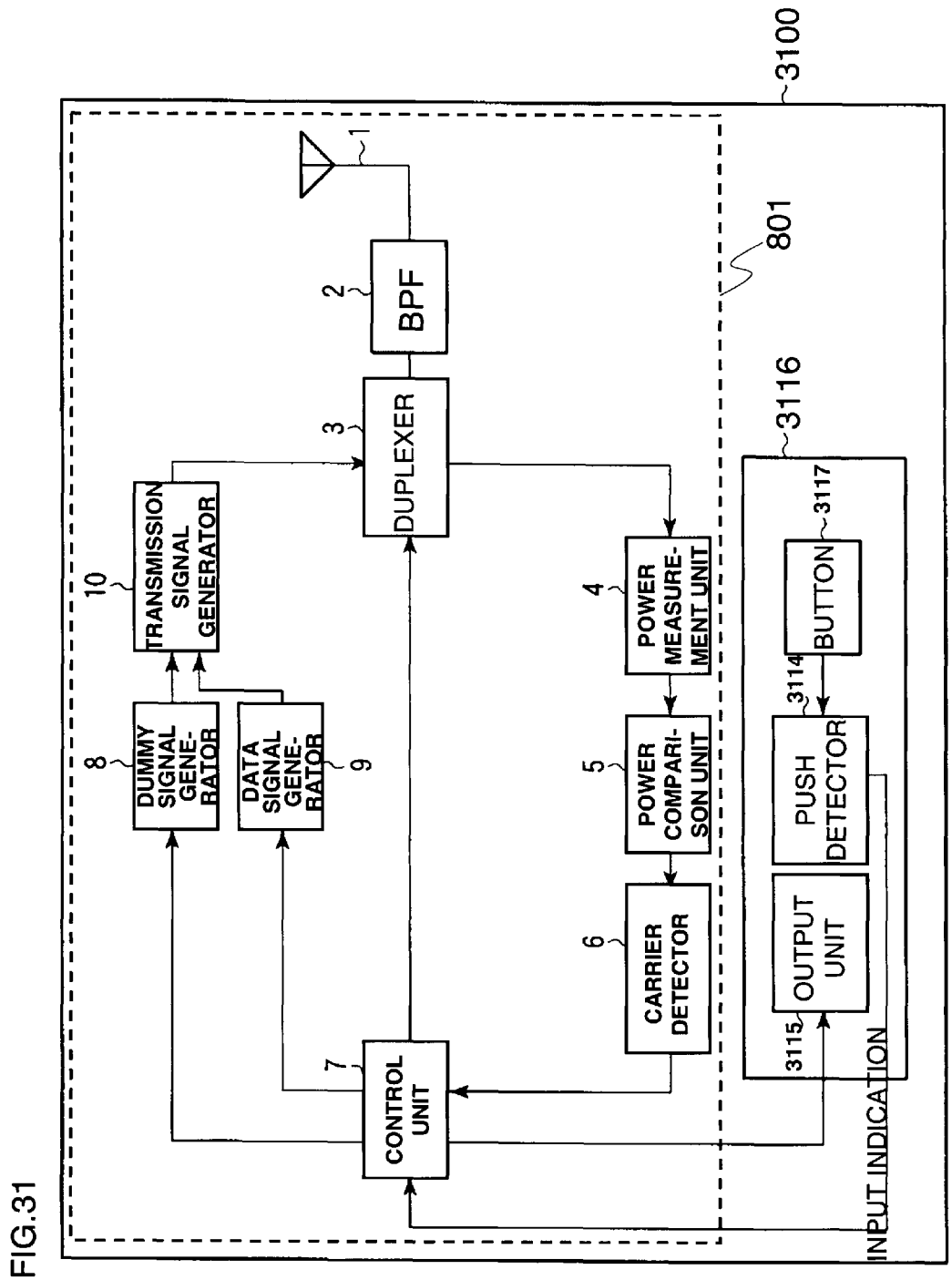
FIG. 31 is a block diagram showing a remote controller 3100 according to the eleventh embodiment.

In the eleventh embodiment, we describes a remote controller 3100 which adopts the transmitter 801 of the eighth embodiment. As shown in FIG. 31, the remote controller 3100 includes the transmitter 801 and an interface unit 3116.

The interface unit 3116 includes a button 3117, a push detector 3114, and a output unit 3115. The interface unit 3116 converts an input from a user by pushing the button 3117 to an input indication. Then, the interface unit 3116 outputs the input indication to the transmitter 801.

The push detector 3114 detects push of the button 3117 and informs it to the control unit 251 by the input indication. The control unit 251 informs it to the duplexer 3 by the control information. Then, the CS and transmission of the signal S8 are performed as same as the eighth embodiment.

The carrier detector 250 has a CS timer (not shown) which counts elapsed time since the CS starts until the duration Tcslim. When the carrier detector 250 has detected a busy during the duration Tcslim, it stops the CS. Then, the carrier detector 250 informs the busy to the control unit 251.

The control unit 251 forwards the busy to the output unit 3115. The output unit 3115 informs the busy to the user by output such as sound, display, and shake.

Figure 32:
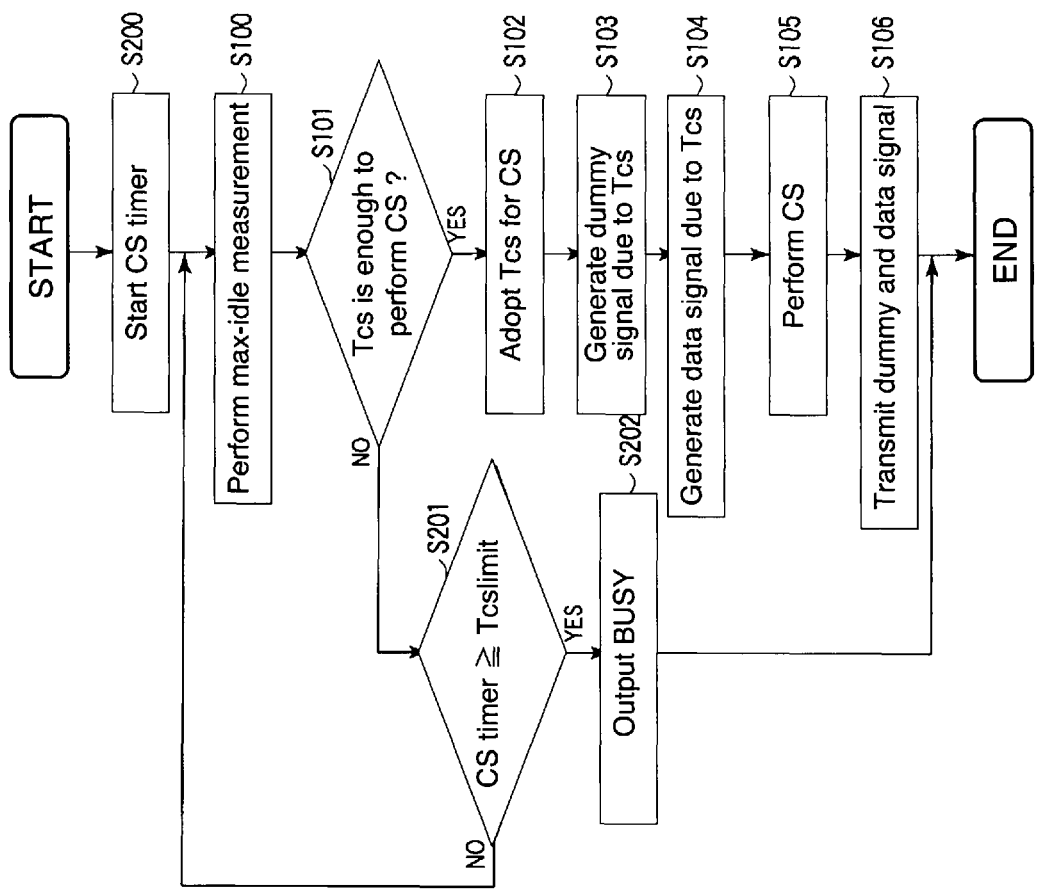
FIG. 32 is a flowchart explaining procedure of the remote controller 3100.

Next, we will describe a procedure of the remote controller 3100. As shown in FIG. 32, the procedure is almost same as the eighth embodiment, except for including the steps S200-S202. The remote controller 3100 starts the CS timer in the step S200. Moreover, the remote controller 3100 compares the elapsed time of the CS timer with the duration Tcslim in the step S201. If the elapsed time is equal or larger than the duration Tcslim, the remote controller 3100 stops performing the max-idle measurement outputs information showing the busy to the user in the step S202.

According to the eleventh embodiment, the remote controller 3100 can indicate fault of the CS with the duration Tcs to the user. Therefore, when the frequency band is crowded, the remote controller 3100 does not wait for long time to detect idle for the duration Tcs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmitter, comprising:
   a power measurement unit measuring a receiving power over a part of a first frequency band and a second frequency band, the first frequency band is allocated to a TDMA system, wherein a frame length of the TDMA system is Tframe and said first frequency band is different from said second frequency band;
   a carrier sense unit continuing to compare for a duration Tcs the receiving power with a threshold; and
   a transmission unit transmitting a dummy signal of a time Td, where Td satisfies Td+Tcs=Tframe, using the second frequency band when the receiving power has been smaller than the threshold for the duration Tcs, and transmitting a data signal using the second frequency band after the dummy signal is transmitted.

2. The transmitter of claim 1, wherein a duration of the dummy signal equals to a time slot of the TDMA system.

3. The transmitter of claim 1, wherein the transmission unit transmits the dummy signal and the data signal several times repeatedly.

4. The transmitter of claim 3, wherein the transmission unit transmits the dummy signal and the data signal with a different power in each transmission.

5. The transmitter of claim 3, wherein the transmission unit transmits the dummy signal and the data signal with a different power in every two transmissions.

6. The transmitter of claim 1, wherein the duration Tcs equals to the time slot of the TDMA system.

7. The transmitter of claim 1, wherein the data signal is divided into n sub-data signals (n>=2), the transmission unit transmits the n signals including the dummy data and i-th sub-data signal (i=1, 2, . . . , n).

8. A transmitter, comprising:
   a power measurement unit measuring a receiving power over a part of a first frequency band and a second frequency band, the first frequency band is allocated to a TDMA system wherein a frame length of the TDMA system is Tframe and said first frequency band is different from said second frequency band;
   a carrier sense unit calculating an autocorrelation of the receiving power in terms of time and compares the autocorrelation with a threshold; and
   a transmission unit transmitting a dummy signal of a time Td, where Td satisfies Td+Tcs=Tframe, using the second frequency band when the autocorrelation has been smaller than the second threshold for a duration Tcs, and transmitting a data signal using the second frequency band after the dummy signal is transmitted.

9. The transmitter of claim 8, wherein the transmission unit transmits the dummy signal and the data signal several times repeatedly.

10. The transmitter of claim 8, wherein the data signal is divided into n sub-data signals (n>=2), the transmission unit transmits the n signals including the dummy data and i-th sub-data signal (i=1, 2, ..., n).

11. The transmitter of claim 1, wherein
the carrier sense unit measures time which the receiving power is smaller than the threshold to obtain a maximum idle duration, and sets the duration Tcs to the maximum idle duration.

12. The transmitter of claim 1, wherein the dummy signal includes a vacant time of which the duration is shorter than the duration Tcs.

13. The transmitter of claim 1, wherein the dummy signal includes a preamble and a payload, which are also included in the data signal.

14. A remote controller comprising:
the transmitter of claim 1; and
an interface to input a instruction from a user and to inform to the transmitter.

15. The remote controller of claim 14, wherein
the carrier sense unit in the transmitter stops comparing the receiving power with the threshold when the carrier sense unit has not detected continuous idle for the duration Tcs and informs a busy to the interface unit,
the interface unit outputs the busy to the user when it receives the busy.

16. A transmission method, comprising:
measuring a receiving power over a part of a first frequency band and a second frequency band, the first frequency band is allocated to a TDMA system, wherein a frame length of the TDMA system is Tframe and said first frequency band is different from said second frequency band;
comparing the receiving power with a threshold;
generating a dummy signal and a data signal when the receiving power has been smaller than the threshold for the duration Tcs; and
transmitting the dummy signal of a time Td, where Td satisfies Td+Tcs=Tframe, and the data signal using the second frequency band.

* * * * *